US012756543B2

(12) United States Patent
Patel et al.

(10) Patent No.: US 12,756,543 B2
(45) Date of Patent: Oct. 6, 2026

(54) METHODS FOR PROTECTING PRIVACY

(71) Applicant: Google LLC, Mountain View, CA (US)

(72) Inventors: Sarvar Patel, Montville, NJ (US); Marcel M.M. Yung, New York, NY (US); Gang Wang, Frederick, MD (US); Karn Seth, New York, NY (US); Mariana Raykova, New York, NY (US); Benjamin R. Kreuter, Jersey City, NJ (US); Ananth Raghunathan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 29 days.

(21) Appl. No.: 18/590,514

(22) Filed: Feb. 28, 2024

(65) Prior Publication Data

US 2024/0204991 A1 Jun. 20, 2024

Related U.S. Application Data

(62) Division of application No. 17/298,893, filed as application No. PCT/US2019/064383 on Dec. 4, 2019, now Pat. No. 11,962,687.

(Continued)

(51) Int. Cl.
*H04L 9/32* (2006.01)
*H04L 9/08* (2006.01)

(52) U.S. Cl.
CPC ............ *H04L 9/085* (2013.01); *H04L 9/0869* (2013.01); *H04L 9/32* (2013.01); *H04L 2209/50* (2013.01)

(58) Field of Classification Search
CPC ......... H04L 9/085; H04L 9/0869; H04L 9/32; H04L 2209/50; H04L 2209/46; H04L 2209/76; H04L 9/008

(Continued)

(56) References Cited

U.S. PATENT DOCUMENTS 8,060,739 B2 * 11/2011 Park .......................... H04L 9/32 713/168
10,644,875 B2 5/2020 Kravitz
(Continued)

FOREIGN PATENT DOCUMENTS

CN 1726669 1/2006
CN 105830086 8/2016
(Continued)

OTHER PUBLICATIONS

Notice of Allowance in Chinese Appln. No. 201980079868.6, mailed on Oct. 23, 2024, 6 pages (with English translation).
(Continued)

*Primary Examiner* — Jahangir Kabir
(74) *Attorney, Agent, or Firm* — Fish & Richardson P.C.

(57) ABSTRACT

A method including at each of a number of client devices receiving a data item, receiving a public key from a second computing system, encrypting the data item using the public key to produce a singly encrypted data item, engaging in an oblivious pseudorandom function protocol with a first computing system using the singly encrypted data item to produce a seed, generating an encrypted secret share using a threshold secret sharing function under which the encrypted secret share cannot be decrypted until a threshold number of encrypted secret shares associated with the same singly encrypted data item are received, and transmitting the encrypted secret share to the first computing system and at the first computing system receiving a number of encrypted secret shares from the number of client devices, processing the number of encrypted secret shares to produce processed data, and transmitting the processed data to a second computing system.

16 Claims, 20 Drawing Sheets

Related U.S. Application Data

(60) Provisional application No. 62/830,266, filed on Apr. 5, 2019.

(58) Field of Classification Search
USPC .......................................................... 713/164
See application file for complete search history.

(56) References Cited

U.S. PATENT DOCUMENTS

| | | | | |
|---|---|---|---|---|
| 11,736,283 | B2 * | 8/2023 | Nix | G06F 21/33 713/168 |
| 2015/0161398 | A1 | 6/2015 | De Cristofaro et al. | |
| 2016/0182228 | A1 | 6/2016 | Smith et al. | |
| 2019/0327088 | A1 | 10/2019 | Camenisch et al. | |
| 2020/0092094 | A1 * | 3/2020 | Resch | H04L 9/0877 |
| 2021/0194679 | A1 | 6/2021 | Yang et al. | |

FOREIGN PATENT DOCUMENTS

| | | |
|---|---|---|
| CN | 107683502 | 2/2018 |
| JP | 2014-137516 | 7/2014 |
| KR | 10-2015-0066572 | 6/2015 |

OTHER PUBLICATIONS

Applebaum et al., “Collaborative, privacy-preserving data aggregation at scale.” Privacy Enhancing Technologies: 10th International Symposium, PETS 2010, Berlin, Germany, Jul. 21-23, 2010, 20 pages.

International Search Report and Written Opinion in International Appln. No. PCT/US2019/064383, mailed on Feb. 6, 2020, 10 pages.

Ishihara et al., “Techniques for “safe” distributed management of confidential information” NTT DoCoMo Technical Jar, vol. 13, No. 3, Oct. 2005, 64-67.

Kanai et al., “Data Management Approach for Multiple Clouds Using Secret Sharing Scheme” In 2014 17th International Conference on Network-Based Information Systems, Sep. 2014, 432-437.

Kurosawa et al., “Reusable Oblivious Pseudorandom Function” Symposium on Cryptography and Information Security (SCIS2018), Institute of Electronics, Information and Communication Engineers, Feb. 13, 2018, 7 pages.

Notice of Allowance in Japanese Appln. No. 2021-531769, mailed on Apr. 24, 2023, 5 pages (with English translation).

Notice of Allowance in Korean Appln. No. 10-2021-7015437, mailed on Sep. 17, 2023, 5 pages (with English translation).

Office Action in Chinese Appln. No. 201980079868.6, mailed on Jan. 12, 2024, 17 pages (with English translation).

Office Action in European Appln. No. 19828422.6, mailed on Jan. 11, 2024, 6 pages.

Office Action in Japanese Appln. No. 2021-531769, mailed on Oct. 17, 2022, 8 pages (with English translation).

Office Action in Korean Appln. No. 10-2021-7015437, mailed on Apr. 21, 2023, 16 pages (with English translation).

Ringberg et al., “Collaborative, Privacy-Preserving Data Aggregation at Scale,” International Association for Cryptologic Research, vol. 20090426:203140, dated Apr. 24, 2009, 12 pages.

Office Action in European Appln. No. 19828422.6, mailed on Dec. 9, 2025, 6 pages.

* cited by examiner

METHODS FOR PROTECTING PRIVACY

CROSS-REFERENCE TO RELATED PATENT APPLICATIONS

The present application is a divisional application of, and claims priority to, U.S. patent application Ser. No. 17/298,893, titled "METHODS FOR PROTECTING PRIVACY," filed on Jun. 1, 2021, which is a National Stage Application, filed under 35 U.S.C. 371, of International Patent Application No. PCT/US2019/064383, filed on Dec. 4, 2019, titled "METHODS FOR PROTECTING PRIVACY," which in turn claims priority to U.S. Provisional Application No. 62/830,266, filed on Apr. 5, 2019, titled "METHODS FOR PROTECTING PRIVACY," the entireties of which are incorporated by reference herein.

BACKGROUND

It can be helpful for analytics systems to be able to determine aggregated information about data from client devices, such as how many devices interacted with a particular item of content. However, there is often an interest in maintaining the privacy of personally identifiable information. For example, an entity may be interested in receiving information about how many devices a particular type of content reached or how many devices interacted in a particular way with the content without receiving information that could identify a source of the information, such as an identifier associated with the devices.

SUMMARY

One implementation of the disclosure relates to a method including at each of a number of client devices receiving a data item, receiving a public key from a second computing system, encrypting the data item using the public key to produce a singly encrypted data item, engaging in an oblivious pseudorandom function protocol with a first computing system using the singly encrypted data item to produce a seed, generating, using the seed and the singly encrypted data item, an encrypted secret share using a threshold secret sharing function under which the encrypted secret share cannot be decrypted until a threshold number of encrypted secret shares associated with the same singly encrypted data item are received, and transmitting the encrypted secret share to the first computing system. Another implementation relates to a method including, at a first computing system, receiving a number of encrypted secret shares from a number of client devices, processing the number of encrypted secret shares to produce processed data, and transmitting the processed data to a second computing system. The number of encrypted secret shares may have been generated by the number of client devices in accordance with the implementation above and/or in accordance with other techniques described herein. Another implementation relates to a method including, at a second computing system, decrypting processed data to produce decrypted processed data, and generating, using the decrypted processed data, a count of the number of secret shares sharing a first characteristic without accessing personally identifiable information associated with a number of client devices. The processed data may have been generated by the second computing system in accordance with the implementations described above and/or with other techniques described herein.

In some implementations, the first computing system is further configured to, before processing the number of encrypted secret shares, shuffling the number of encrypted secret shares. In some implementations, engaging in the oblivious pseudorandom function protocol to produce the seed includes using the singly encrypted data item and a crowd identifier, wherein the crowd identifier is associated with two or more of the number of client devices. In some implementations, the first computing system is part of the second computing system. In some implementations, the first computing system exists within a protected environment of the second computing system, the protected environment preventing the second computing system from accessing the first computing system.

In some implementations, each of the number of client devices engages in the oblivious pseudorandom function protocol with a third computing system using the singly encrypted data item to produce the seed. In some implementations, the second computing system processes the number of encrypted secret shares to produce the processed data. In some implementations, the number of client devices communicate with the first computing system using a secure network, wherein the secure network is an onion network. In some implementations, engaging in the oblivious pseudorandom function protocol to produce the seed includes using the singly encrypted data item and a private identifier, wherein the private identifier uniquely identifies a client device of the number of client devices. In some implementations, the first computing system is a distributed computing system.

Another implementation of the disclosure relates to one or more computing devise having one or more memories having instructions stored thereon, and one or more processors configured to execute the instructions to perform the methods of the implementations set out above or described herein. For example, another implementation relates to a first computing system including a memory having instructions stored thereon, and a processor configured to execute the instructions to engage, with a number of client devices, in an oblivious pseudorandom function protocol using a number of data items to produce a number of seeds, receive, from the number of client devices, a number of encrypted secret shares and a number of verification shares, authenticate the number of encrypted secret shares using the number of verification shares, process the number of encrypted secret shares to produce processed data, and transmit the processed data to a second computing system.

In some implementations, the first computing system is further configured to shuffle the number of encrypted secret shares before processing. In some implementations, engaging in the oblivious pseudorandom function protocol to produce the seed includes encoding a crowd identifier into the seed, wherein the crowd identifier is associated with two or more of the number of client devices. In some implementations, the first computing system is part of the second computing system. In some implementations, the first computing system exists within a protected environment of the second computing system, the protected environment preventing the second computing system from accessing the first computing system. In some implementations, the first computing system communicates with the number of client devices using a secure network, wherein the secure network is an onion network.

In some implementations, engaging in the oblivious pseudorandom function protocol to produce the seed includes using a private identifier, wherein the private identifier uniquely identifies a client device of the number of client devices. In some implementations, the first computing system is a distributed computing system. In some implementations, processing the number of encrypted secret shares to produce the processed data includes decrypting the encrypted secret shares using a threshold encryption function protocol. In some implementations, the first computing system further includes an application programming interface (API), wherein the first computing system transmits the processed data to the second computing system in response to an API query from the second computing system.

The various aspects and implementations may be combined where appropriate.

DETAILED DESCRIPTION

Figure 1:
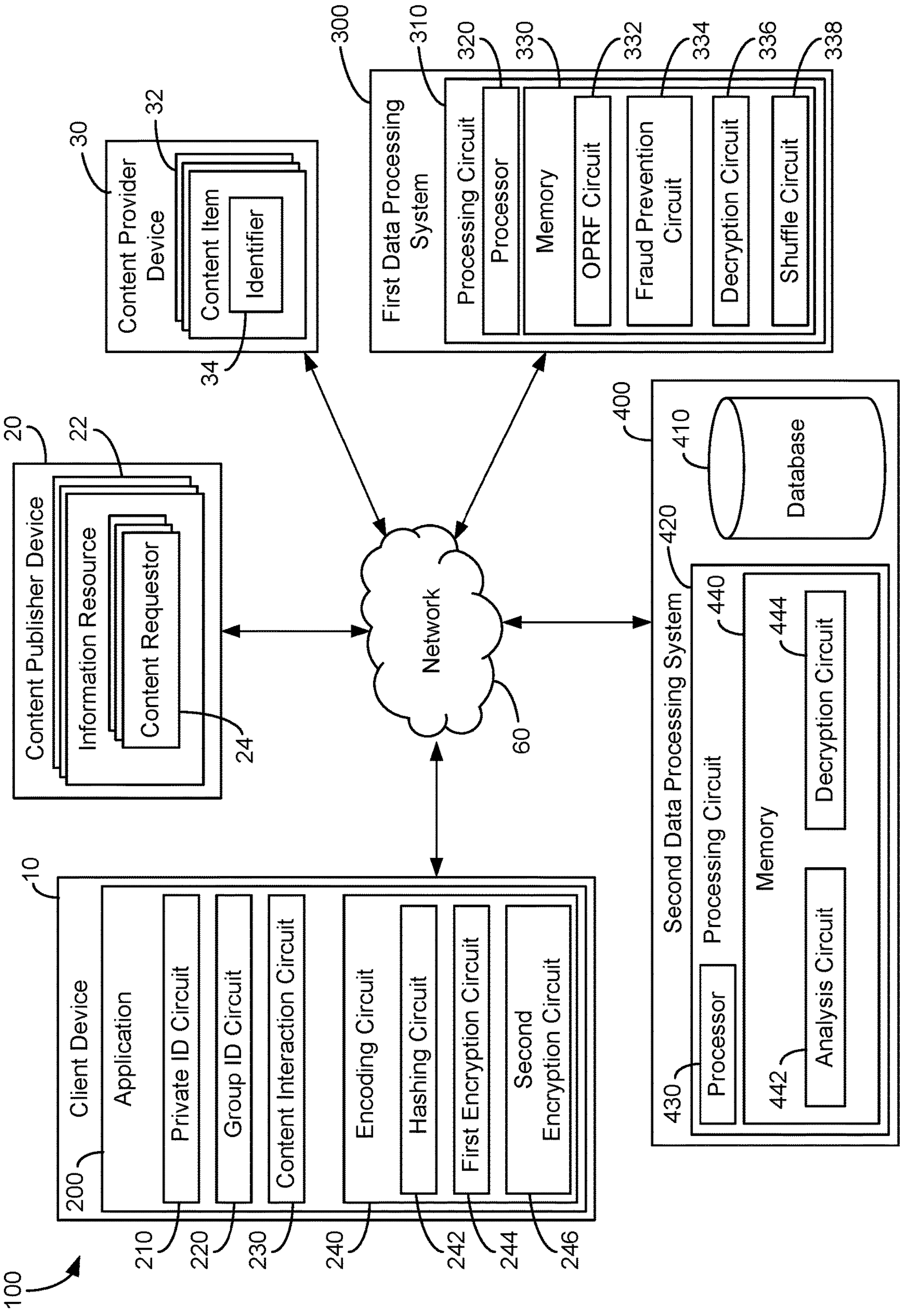
FIG. 1 is a diagram illustrating various entities interacting over a network, according to an illustrative implementation.

Following below are more detailed descriptions of various concepts related to, and implementations of, methods, apparatuses, and systems for correlating online interactions with offline actions in a privacy conscious manner. The various concepts introduced above and discussed in greater detail below may be implemented in any of numerous ways, as the described concepts are not limited to any particular manner of implementation.

In many domains, it may be necessary or desirable to determine aggregated measurements of predefined actions or interactions with software or content by users. For example, in the field of digital therapeutics (health-care interventions driven by software programs to prevent, manage or treat a medical disorder or disease), it is often necessary to determine intervention compliance (i.e., the number of patients that successfully engaged in the prescribed action(s)). In other domains, it may be desirable for a provider of third party content to determine a rate of interaction with that third party content.

System and methods of the present disclosure relate generally to supplying a content provider with information about online interactions related to online content produced by the content provider in a secure manner. More specifically, systems and methods of the present disclosure relate to unique cryptography and computer architecture methodologies to correlate data from different entities in a more secure way. Typically, correlating data from different entities requires a computing system to have access to user specific data. To avoid revealing personally identifiable information ("PII"), the identity of the user must be hidden and suitably protected when reporting the data.

It is desirable to conduct certain analysis activities in a manner that protects against the exposure of PII. Therefore, there is a need for a unique cryptography and computer architecture methodology to correlate data from different entities in a more secure way. Aspects of the present disclosure provide improved encryption methods and computer architectures. The encryption methods and architectures may be used to correlate users' online interactions in a secure way, by providing increased security and also conserving user privacy.

To ensure the privacy and security of PII, systems and methods of the present disclosure anonymize data to prevent entities (e.g., a content provider, a third party, etc.) from receiving PII. A non-limiting example implementation is as follows: a second data processing system may produce a public key for asymmetric encryption. A client device may encrypt interaction data using the public key. The client device may engage in an oblivious pseudorandom function (OPRF) protocol with a first data processing system using the encrypted interaction data to produce a seed. The client device may threshold encrypt the encrypted interaction data to generate a secret share. The first data processing system may receive, from a number of client devices, a number of secret shares. Once a threshold number of secret shares is received, the first data processing system may decrypt the secret shares to recover the encrypted interaction data. The first data processing system may send the encrypted interaction data to the second data processing system which may decrypt the encrypted interaction data using a private key corresponding to the public key. Therefore, the second data processing system may facilitate correlation of interaction data without revealing PII.

For example, an application (e.g., a web browser) on a computing device such as a personal computer, smartphone, or tablet may navigate to a web page (or other online document) maintained by a content publisher. The content publisher may include content items produced by the content provider. The computing device may identify (i) interactions with the content items and/or (ii) interactions with the content provider that are the result of interaction with the content items. The interactions may be associated with an identifier. The computing device may securely transmit the identifier and/or additional information regarding the effectiveness of online content in generating interactions to a first data processing system (e.g., a privacy proxy). The first data processing system may anonymize the information and transmit it to a second data processing system. The second data processing system may provide more detailed information regarding the interaction, including whether a purchase occurred, what item, if any, was purchased, and a price of the item.

Referring now to FIG. 1, a system 100 for securely correlating data from different entities is shown, according to an illustrative implementation. System 100 includes client device 10, content publisher device 20, content provider device 30, first data processing system 300, and second data processing system 400. In various implementations, components of system 100 communicate over network 60. Network 60 may include computer networks such as the Internet, local, wide, metro or other area networks, intranets, satellite networks, other computer networks such as voice or data mobile phone communication networks, combinations thereof, or any other type of electronic communications network. Network 60 may include or constitute a display network (e.g., a subset of information resources available on the Internet that are associated with a content placement or search engine results system, or that are eligible to include third party content items as part of a content item placement campaign). In various implementations, network 60 facilitates secure communication between components of system 100. As a non-limiting example, network 60 may implement transport layer security (TLS), secure sockets layer (SSL), hypertext transfer protocol secure (HTTPS), and/or any other secure communication protocol.

Client device 10 may be a personal computer, mobile computing device, smartphone, tablet, or any other device to facilitate receiving, displaying, and interacting with online content (e.g., web pages). Client device 10 may include an application 200 to receive and display online content and to receive user interaction with the online content. For example, application 200 may be a web browser.

In various implementations, application 200 interacts with content publisher device 20 and content provider device 30 to receive online content. For example, application 200 may receive information resources 22 from content publisher device 20. In various implementations, content publisher device 20 is associated with a content publisher. Information resources 22 may be web-based content items such as a web page or other online document. Information resources 22 may include instructions (e.g., scripts, executable code, etc.) that when interpreted by application 200 cause application 200 to display a graphical user interface such as an interactable web page to a user. In various implementations, information resources 22 include one or more content requestors 24. Content requestors 24 may facilitate including content other than that provided by content publisher device 20. For example, an online document may include slots configured for the display of marketing items (e.g., advertisements). Content requestors 24 may include a location of the content being requested. In some implementations, content requestors 24 are dynamic. For example, content requestors 24 may interact with one or more third parties to determine what content to include. As a concrete example, an information resource 22 including a content requestor 24 may be displayed on a mobile device. The content requestor 24 may therefore request content specific to mobile devices (e.g., having a different size, etc.).

Content provider device 30 may host content items 32. In various implementations, content provider device 30 is associated with a content provider. Content provider device 30 may be or include a third party computing system. For example, content provider device 30 may be a server associated with a retailer. Content items 32 may be marking items (e.g., advertisements) associated with a third party. Additionally or alternatively, content items 32 may include other content configured to be included within information resources 22. For example, a first content item 32 may be a "share button" configured to link to a social media platform and a second content item 32 may be a RSS news feed configured to display news headlines.

Content items 32 may include identifier 34. In various implementations, identifier 34 uniquely identifies each of content items 32. In some implementations, identifier 34 is associated with a marketing campaign. For example, users with an interest in sporting activities may receive content items 32 associated with sporting goods and each of the content items 32 may share an identifier 34. In some implementations, application 200 stores identifiers 34 associated with received information resources 22. Partitioning of identifiers 34 is described in detail with reference to FIGS. 2-4 below.

Application 200 is shown to include private ID circuit 210, group ID circuit 220, content interaction circuit 230, and encoding circuit 240. Private ID circuit 210 may facilitate generation of a private ID. The private ID may uniquely identify client device 10. Additionally or alternatively, the private ID may uniquely identify a user associated with client device 10. As a concrete example, a user may have a first client device 10 and a second client device 10. The first and second client devices 10 may each have application 200 installed thereon (e.g., the first client device 10 having a first installation of application 200 and the second client device 10 having a second installation of application 200). Private ID circuit 210 may produce a private ID for the first and second client devices 10. The private ID may be the same for both the first and second client devices 10 thereby uniquely identifying the user and the first and second client devices 10 as client devices 10 of the user. In some implementations, the interaction data shared by client device 10 includes the private ID. In various implementations, private ID circuit 210 interacts with one or more outside systems/components to generate a private ID.

Group ID circuit 220 may facilitate generation of a group ID. The group ID may uniquely identify groups of client devices 10. For example, the group ID may group client devices 10 by software version, device type, device configuration, or any other factor. Additionally or alternatively, the group ID may uniquely identify groups of users. For example, the group ID may group users by geography, demographic information, interests, or any other factor. In some implementations, group ID circuit 220 may facilitate generation of a number of group ID's. For example, group ID circuit 220 may facilitate generation of a first group ID indicating that a user is in the Midwest, a second group ID indicating that the user's client device 10 is a smartphone, and a third group ID indicating that the user is over the age of 18. In some implementations, the interaction data shared by client device 10 includes the one or more group ID's. In various implementations, group ID circuit 220 interacts with one or more outside systems/components to generate a private ID.

Content interaction circuit 230 is configured to review user interaction with information resources 22 and/or content items 32 and generate interaction data. For example, application 200 may display to a user a webpage having a third party content item 32 associated with an identifier 34. Content interaction circuit 230 may store the identifier 34. The user may then visit (e.g., using application 200) a different webpage associated with the third party and purchase an item. In response, content interaction circuit 230 may generate interaction data. The interaction data may include the identifier 34 and/or information relating to the purchased item. In various implementations, content interaction circuit 230 includes a private ID and/or one or more group ID's in the interaction data. Systems and methods of the present disclosure relate to secure transmission of interaction data. For example, application 200 may securely transmit interaction data to second data processing system 400 without revealing a source of the interaction data. Content interaction circuit is described in detail with reference to FIGS. 2-4 below.

Encoding circuit 240 is configured to encode interaction data. For example, encoding circuit 240 may encrypt interaction data. Additionally or alternatively, encoding circuit 240 may perform various obliviating functions on interaction data. For example, encoding circuit 240 may remove identifiers (e.g., IP address, etc.), fragment the interaction data, add noise, or perform other functions to anonymize the interaction data. Encoding circuit 240 may include hashing circuit 242, first encryption circuit 244, and second encryption circuit 246.

Hashing circuit 242 may implement one or more hashing functions on input data to produce hashed data. Hashing circuit 242 may implement any hashing function. As a non-limiting example, hashing circuit 242 may implement SHA-2, Scrypt, Balloon, and/or Argon2. In some implementations, hashing circuit 242 facilitates multiple rounds of hashing. For example, hashing circuit 242 may perform a first SHA-2 hash on a data item to produce a hashed data item and may perform a second Scrypt hash on the hashed data item to produce a doubly hashed data item.

First encryption circuit 244 may implement one or more encryption functions on input data to produce encrypted data. In some implementations, first encryption circuit 244 implements an asymmetric encryption function. For example, first encryption circuit 244 may implement a Rivest-Shamir-Adleman (RSA) cryptosystem. In various implementations, first encryption circuit 244 interacts with hashing circuit 242 to encrypt input data. For example, hashing circuit 244 may produce a seed used by first encryption circuit 244 to encrypt input data. In some implementations, first encryption circuit 244 implements symmetric encryption. Additionally or alternatively, first encryption circuit 244 may combine multiple encryption functions. For example, first encryption circuit 244 may asymmetrically encrypt a symmetric encryption key and then symmetrically encrypt input data using the symmetric encryption key.

Second encryption circuit 246 may implement one or more threshold encryption functions on input data to produce threshold encrypted data. As a non-limiting example, second encryption circuit 246 may implement a digital signature algorithm (DSA), an elliptic curve digital signature algorithm (ECDSA), and/or a Shamir secret sharing (SSS) algorithm. Second encryption circuit 246 may interact with one or more external systems to perform threshold encryption. For example, second encryption circuit 246 may engage in an oblivious pseudorandom function (OPRF) protocol with first data processing system 300 to produce a seed used by second encryption circuit 246 to threshold encrypt input data. Second encryption circuit 246 is described in detail with reference to FIGS. 5-13.

First data processing system 300 may facilitate anonymization of interaction data. In various implementations, first data processing system 300 receives interaction data from client device 10 and performs various functions on the interaction data to obfuscate an identity or source of the interaction data. In various implementations, first data processing system 300 receives data and anonymizes the data to produce differentially-private data. Differentially-private data, such as a differentially-private dataset, ensures that an observer may not identify whether data from a particular individual is included in the dataset. For example, a computing system may receive data from a number of individuals and publish aggregate information regarding the data. The aggregate information is differentially-private if an observer cannot identify if any individual (e.g., those that supplied data and those that did not supply data) supplied the data that was used to produce the aggregate information. In various implementations, first data processing system 300 is a secure environment such that it does not allow access to non-anonymous data. First data processing system 300 may be a server, distributed processing cluster, cloud processing system, or any other computing device. First data processing system 300 may include or execute at least one computer program or at least one script. In some implementations, first data processing system 300 includes combinations of software and hardware, such as one or more processors configured to execute one or more scripts.

First data processing system 300 is shown to include processing circuit 310 having processor 320 and memory 330. Memory 330 may have instructions stored thereon that, when executed by processor 320, cause processing circuit 310 to perform the various operations described herein. The operations described herein may be implemented using software, hardware, or a combination thereof. Processor 320 may include a microprocessor, ASIC, FPGA, etc., or combinations thereof. In many implementations, processor 320 may be a multi-core processor or an array of processors. Processor 320 may implement or facilitate secure environments. For example, processor 320 may implement software guard extensions (SGX) to define private regions (e.g., enclaves) in memory 330. Memory 330 may include, but is not limited to, electronic, optical, magnetic, or any other storage devices capable of providing processor 320 with program instructions. Memory 330 may include a floppy disk, CD-ROM, DVD, magnetic disk, memory chip, ROM, RAM, EEPROM, EPROM, flash memory, optical media, or any other suitable memory from which processor 320 can read instructions. The instructions may include code from any suitable computer programming language such as, but not limited to, C, C++, C #, Java, JavaScript, Perl, HTML, XML, Python and Visual Basic.

Memory 330 may include OPRF circuit 332, fraud prevention circuit 334, decryption circuit 336, and shuffle circuit 338. OPRF circuit 332 may implement an OPRF. In various implementations, OPRF circuit 332 may function as a random oracle. In some implementations, OPRF circuit 332 interacts with application 200 to produce or facilitate cryptographic primitives. For example, OPRF circuit 332 may interact with application 200 to produce a seed used by encoding circuit 240 to encode interaction data. OPRF circuit 332 is described in detail below with reference to FIGS. 5-13.

Fraud prevention circuit 334 may analyze interaction data to identify and prevent fraudulent data. For example, a malicious user may submit falsified interaction data using client device 10 and fraud prevention circuit 334 may analyze the falsified interaction data to identify it as fraudulent data. In some implementations, fraud prevention circuit 334 facilitates digital signatures. As a non-limiting example, fraud prevention circuit 334 may implement or facilitate a verifiable secret share (VSS) algorithm, an aggregate signature algorithm, a Rabin signature algorithm, and/or any other digital signature system. In some implementations, fraud prevention circuit 334 facilitates authentication and ensures integrity of interaction data. Fraud prevention circuit 334 is described in detail below with reference to FIGS. 5-13.

Decryption circuit 336 may receive encrypted data and decrypt it to produce unencrypted data. In various implementations, decryption circuit 336 receives encrypted data from client device 10. Decryption circuit 336 may decrypt threshold encrypted data. Threshold encryption may guarantee minimum threshold cardinality thereby ensuring that individual data becomes part of an anonymous crowd of data. Additionally or alternatively, decryption circuit 336 may decrypt symmetric and/or asymmetrically encrypted data. For example, decryption circuit 336 may asymmetrically decrypt first encrypted data using a private key to recover a shared key and use the shared key to symmetrically decrypt second encrypted data to recover interaction data. In various implementations, decryption circuit 336 produces encryption keys. The encryption keys may be shared with other components of system 100 (e.g., first encryption circuit 244, second encryption circuit 246, etc.). Additionally or alternatively, decryption circuit 336 may receive and/or include one or more secrets (e.g., keys, codes, etc.) to facilitate decryption of data from different entities. In some implementations, decryption circuit 336 facilitates robust recovery of adulterated encrypted data. For example, a malicious user may submit falsified or improperly secret shares using client device 10 and decryption circuit 336 may recover the underlying data using one or more recovery functions. As a non-limiting example, decryption circuit 336 may implement or facilitate error correcting codes (ECC), limited domain evaluation techniques, and/or any other recovery operations. In various implementations, decryption circuit 336 interacts with fraud prevention circuit 334 to perform recovery operations.

Shuffle circuit 338 may receive data and perform various obscuring functions to produce anonymous data. As a non-limiting example, shuffle circuit 338 may implement or facilitate removing implicit/indirect identifiers (e.g., arrival time, order, originating IP address, etc.), performing batching operations, introducing noise, and/or performing any other anonymizing operation. In various implementations, shuffle circuit 338 shuffles (e.g., rearranges, changes an order of, etc.) received data to produce shuffled data. For example, shuffle circuit 338 may receive first data from a first source and second data from a second source, may break the first and second data into five pieces each, and may shuffle the ten pieces together to produce shuffled data. In some implementations, shuffle circuit 338 implements a batch shuffling algorithm.

Second data processing system 400 may facilitate securely correlating data from different entities. In various implementations, second data processing system 400 receives anonymous interaction data and generates aggregate information regarding the anonymous interaction data. The aggregate information may describe a number or grouping of online interactions (e.g., interactions with a number of content items). Additionally or alternatively, the aggregate information may describe an individual online interaction (e.g., a single interaction with a single content item). Aggregate information may include a unique identifier (e.g., identifier 34, etc.). In some implementations, the identifier identifies a marketing campaign. Additionally or alternatively, the identifier may uniquely identify each online interaction. In some implementations, the aggregate information describes one or more interactions associated with content items 34. For example, aggregate information may include a time, date, and/or location of online interactions. The interactions described by the anonymous interaction data may include viewing a content item (e.g., navigating to a webpage in which a content item is presented and/or determining that the item or a portion of the item is presented within a viewport of the device upon which the webpage is viewed, etc.), selecting/clicking a content item, hovering over a content item, and/or other interactions with a content item 32. In various implementations, second data processing system 400 implements or facilitates cryptographic operations. For example, second data processing system 400 may generate an asymmetric encryption public key. Second data processing system 400 may be a server, distributed processing cluster, cloud processing system, or any other computing device. Second data processing system 400 may include or execute at least one computer program or at least one script. In some implementations, second data processing system 400 includes combinations of software and hardware, such as one or more processors configured to execute one or more scripts.

Second data processing system 400 is shown to include database 410 and processing circuit 420. Database 410 may store received anonymous interaction data. In some implementations, database 410 stores identifiers 34. For example, upon serving a content item 32 to a client device 10, content provider device 30 may send an identifier 34 and/or other information associated with the content item 32 to second data processing system 400 for storage in database 410. The identifier 34 may be used later for correlation of anonymous interaction data. Database 410 may include one or more storage mediums. The storage mediums may include but are not limited to magnetic storage, optical storage, flash storage, and/or RAM. Second data processing system 400 may implement or facilitate various APIs to perform database functions (i.e., managing data stored in database 410). The APIs can be but are not limited to SQL, ODBC, JDBC, and/or any other data storage and manipulation API.

Processing circuit 420 includes processor 430 and memory 440. Memory 440 may have instructions stored thereon that, when executed by processor 430, cause processing circuit 420 to perform the various operations described herein. The operations described herein may be implemented using software, hardware, or a combination thereof. Processor 430 may include a microprocessor, ASIC, FPGA, etc., or combinations thereof. In many implementations, processor 430 may be a multi-core processor or an array of processors. Processor 430 may implement or facilitate secure environments. For example, processor 430 may implement software guard extensions (SGX) to define private regions (e.g., enclaves) in memory 440. Memory 440 may include, but is not limited to, electronic, optical, magnetic, or any other storage devices capable of providing processor 430 with program instructions. Memory 440 may include a floppy disk, CD-ROM, DVD, magnetic disk, memory chip, ROM, RAM, EEPROM, EPROM, flash memory, optical media, or any other suitable memory from which processor 430 can read instructions. The instructions may include code from any suitable computer programming language such as, but not limited to, C, C++, C #, Java, JavaScript, Perl, HTML, XML, Python and Visual Basic.

Memory 440 may include analysis circuit 442 and decryption circuit 444. Analysis circuit 442 may receive anonymous interaction data and produce aggregate information regarding the anonymous interaction data. In various implementations, analysis circuit 442 performs statistical operations on received data to produce statistical measurements describing the received data. For example, analysis circuit 442 may determine an interaction rate associated with a marketing campaign.

Decryption circuit 444 may receive encrypted data and decrypt it to produce unencrypted data. In various implementations, decryption circuit 444 receives encrypted data from first data processing system 300. Decryption circuit 444 may decrypt asymmetrically encrypted data. Additionally or alternatively, decryption circuit 444 may decrypt symmetric and/or threshold encrypted data. In various implementations, decryption circuit 444 produces encryption keys. The encryption keys may be shared with other components of system 100 (e.g., client device 10, first data processing system 300, etc.). Additionally or alternatively, decryption circuit 444 may receive and/or include one or more secrets (e.g., keys, codes, etc.) to facilitate decryption of data from different entities.

Figure 2:
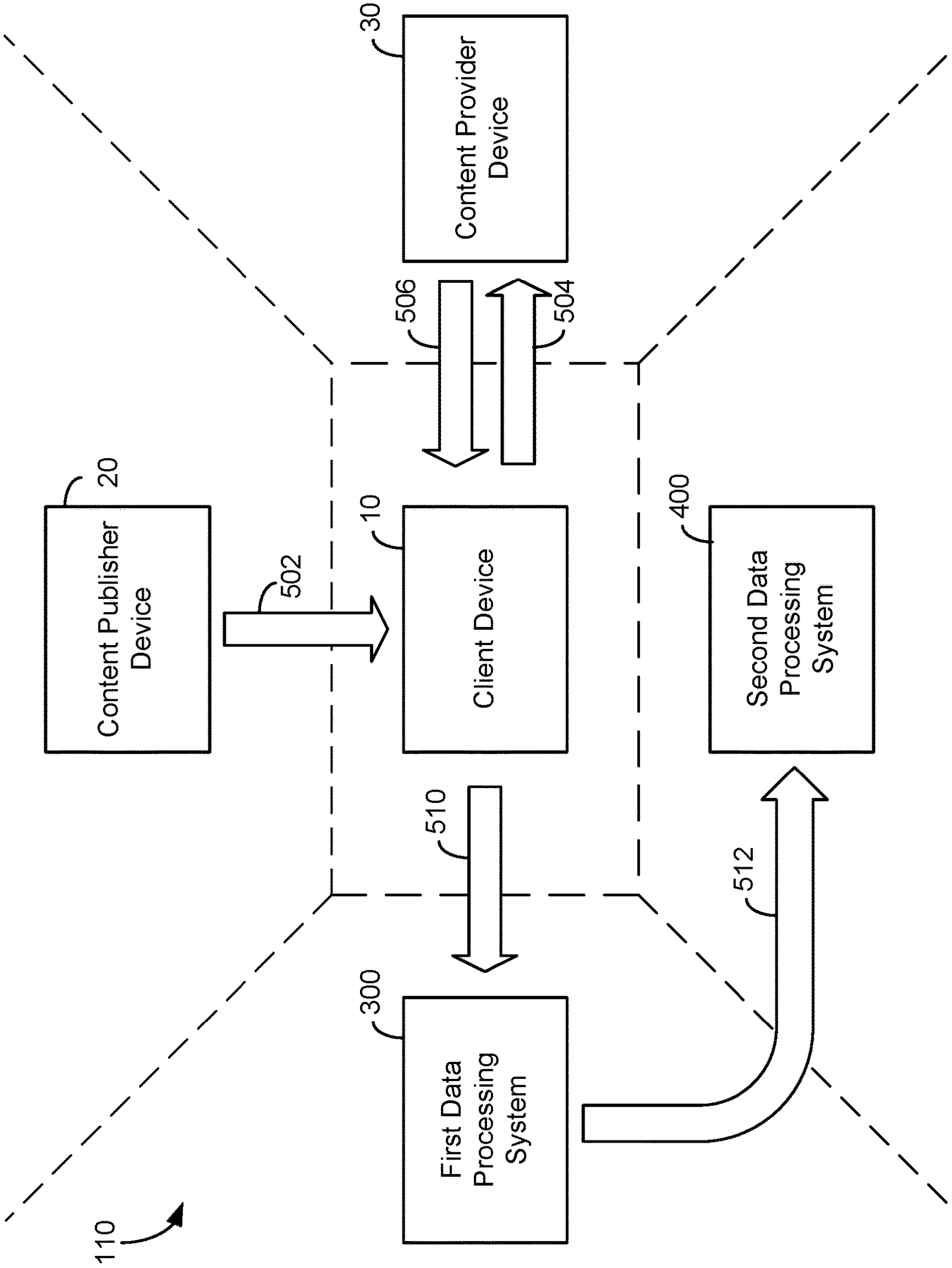
FIG. 2 is a diagram illustrating data transfer and correlation using an encode-shuffle-analyze (ESA) architecture, according to an implementation.
Figure 3:
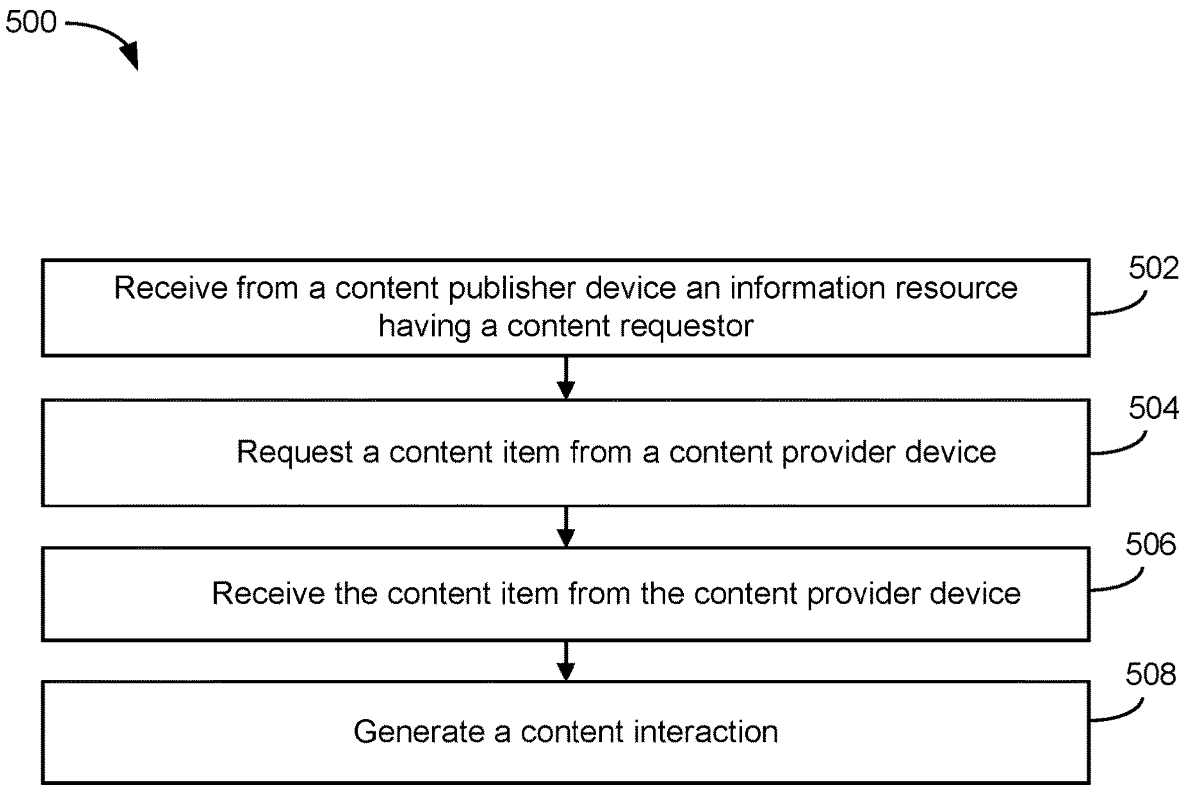
FIG. 3 is a flow diagram illustrating a method of generating interaction data for the ESA architecture of FIG. 2, according to an illustrative implementation.
Figure 4:
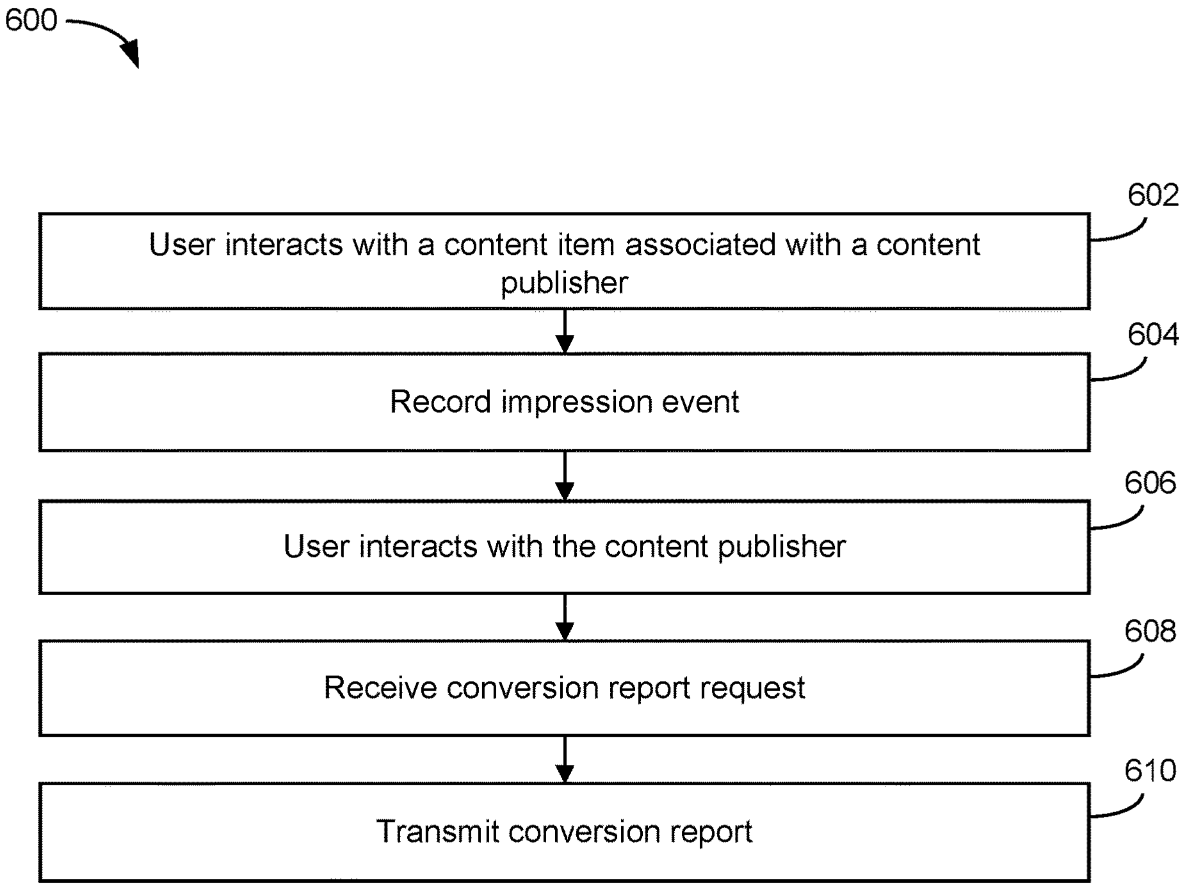
FIG. 4 is a flow diagram illustrating another method of generating interaction data for the ESA architecture of FIG. 2, according to an illustrative implementation.

Referring now to FIGS. 2-4, an improved computer architecture for securely transmitting and correlating data from different entities is shown, according to an illustrative implementation. In brief summary, content providers 30 may provide content items 32 to users via client devices 10. Content items 32 may be specific to specific users. Users may interact with content items 32. For example, a user shown a video may click on the video. It is desirable to measure user interaction with content items 32. For example, a content provider device 30 providing a video may wish to know how many users clicked on the video. Additionally or alternatively, users may interact with other content provided by content provider device 30 as a result of their interaction with the content item 32. For example, a user shown a video may later visit a website maintained by the content provider device 30 to purchase an item featured in the video. In some implementations, the interaction is or is associated with an online conversion. Therefore, there is a need for a system to securely and anonymously measure user interaction with online content without revealing PII. A novel cryptography and computer architecture as described herein facilitates secure and anonymous measurement of user interactions with online content without revealing PII.

For example, FIG. 2 is a system 110 for securely transmitting and correlating data from different entities. In various implementations, system 110 implements an encode-shuffle-analyze (ESA) architecture. The ESA architecture may facilitate anonymization of interaction data. For example, client device 10 may interact with content publisher device 20 and/or content provider device 30 to generate interaction data. Client device 10 may encode the interaction data and securely transmit it to first data processing system 300 for shuffling. First data processing system 300 may shuffle (e.g., perform various obfuscating operations on the received data) the received data and securely transmit the shuffled data to second data processing system 400. Second data processing system 400 may analyze (e.g., perform various correlation operations of the received data) the received data and produce aggregate information without revealing PII.

At step 502, client device 10 receives an information resource 22 from content publisher device 20. In some implementations, the information resource is a webpage. As a concrete example, a user using a browser (e.g., application 200, etc.) may navigate to a webpage (e.g., information resource 22, etc.) published by a search engine (e.g., content publisher, etc.). Additionally or alternatively, the information resource may be a third party information resource. As a concrete example, a user using a browser (e.g., application 200, etc.) may navigate to a third party resource on which a content publisher published a content item produced by a content provider. In various implementations, information resource 22 includes content requestor 24. Application 200 may determine a location of a content item 32 associated with information resource 22 based on content requestor 24. For example, content requestor 24 may include a tag (e.g., a URL address, a parameterized string, a content domain, etc.) supplying the location of the content item 32. Additionally or alternatively, content requestor 24 may include a tag indicating a third party to supply the content item 32. For example, a content requestor 24 may include a tag directing application 200 to fetch the content item 34 from second data processing system 400 which generates the specific content item 34 dynamically based on input data. At step 504, application 200 sends a request to content provider device 30 for the content item 32 specified by content requestor 24. As noted above, in some implementations, content provider device 30 may be or may be associated with second data processing system 400. At step 506, content provider device 30 sends the requested content item 32 to client device 10. In various implementations, content item 32 includes identifier 34. In some implementations, content provider device 30 records identifier 34 and an identifier of client device 10. For example, content provider device 30 may record that identifier "20742280" was sent to client device "2480802349."

Application 200 may display the received information resource 22 and/or content item 32. In some implementations, application 200 records identifier 34. A user using application 200 may interact with online content. For example, the user may interact with the received content item 32. Additionally or alternatively, the user may interact with other online content. For example, the user may interact with online content associated with the received content item 32 and/or content provider device 30. As a concrete example, the user may receive a video content item 32 and then visit a website maintained by the content provider device 30 that provided the video content item 32 to purchase a product that was featured in the video content item 32. In response to the user interaction with the online content, application 200 may generate interaction data. In various implementations, the interaction data includes the identifier 34 of the content item 32 associated with the online content that the user interacted with. Additionally or alternatively, the interaction data may include other information. For example, the interaction data may include data associated with the interaction, client device 10, and/or the online content provider. As a concrete example, for interaction data describing a purchase, the interaction data may describe a series of actions (e.g., clicks) the user made leading up to the purchase as well as information regarding the purchase itself (e.g., price, item purchased, etc.).

In various implementations, client device 10 encodes the interaction data. Encoding may include encrypting the interaction data. Additionally or alternatively, other encoding operations may be used. For example, client device 10 may remove identifiers from the interaction data and/or break the interaction data into pieces. At step 510, client device 10 transmits the encoded interaction data to first data processing system 300. In various implementations, client device 10 securely transmits the encoded interaction data. For example, client device 10 may transmit the encoded interaction data using onion routing to obscure its IP address.

First data processing system 300 may receive the encoded interaction data and perform various shuffling operations. For example, first data processing system 300 may batch received encoded interaction data. In some implementations, first data processing system 300 implements minimum threshold cardinality restrictions on received encoded transaction data. For example, first data processing system 300 may discard data for which minimum thresholds are not met. As a concrete example, first data processing system 300 may discard received encoded transaction data unless it is received from at least a thousand different client devices 10. Additionally or alternatively, the shuffling operations may include removing implicit identifiers, shuffling (e.g., changing an order of, intermingling data from different sources, etc.) the received encoded interaction data, or any other anonymizing operations.

At step 512, first data processing system 300 transmits the shuffled interaction data to second data processing system 400. Second data processing system 400 may receive the shuffled interaction data and perform various analysis operations to produce aggregate information. For example, second data processing system 400 may perform statistical analysis to determine statistical measures (e.g., mean, median, mode, standard deviation, variance, etc.) associated with the underlying interaction data and/or underlying online interactions. As a concrete example, second data processing system 400 may receive shuffled interaction data associated with a first content item 32 and may determine the median value of any purchases that resulted from interaction with the first content item 32. It should be understood that while several exemplary implementations of analysis performed by second data processing system 400 are described, any analysis operation is within the scope of the present disclosure. For example, the aggregate information may include a sum of interactions (e.g., transactions, clicks, phone calls, etc.), a sum of the value associated with each interaction (e.g., a dollar amount), and metadata. In various implementations, second data processing system 400 performs decryption operations. For example, second data processing system 400 may decrypt interaction data encrypted by client device 10 during the encoding process.

Referring now to FIG. 3, a method 500 of generating interaction data is shown, according to an implementation. In brief summary, application 200 generates interaction data in response to interactions associated with a user. In various implementations, the interactions are online interactions. In various implementations, the online interactions are associated with one or more content items 32. Additionally or alternatively, the interactions may be offline interactions. At step 502, application 200 receives from content publisher device 20 an information resource 22 having a content requestor 24. In various implementations, application 200 receives multiple information resources 22 and/or multiple content requestors 24. At step 504, application 200 requests a content item 32 from content provider device 30. In various implementations, application 200 requests multiple content items 32 from one or more content providers 30 (e.g., a first content item 32 from a first content provider device 30 and a second content item 32 from a second content provider device 30, etc.). In some implementations, application 200 interacts with an ad-network to request the content items 32 (e.g., application 200 may dynamically provision content items 32, etc.). For example, content requestor 24 may include a first query to an ad-network and application 200 may execute the first query to receive a second query for a content provider device 30 and may execute the second query with the content provider device 30 to receive the content item 32.

At step 506, application 200 receives the content item 32 from content provider device 30. Application 200 may record an identifier 34 associated with the received content item 32. Additionally or alternatively, application 200 may record an impression. The impression may include identifier 34 and/or an address for content publisher device 20 and/or content provider device 30 (e.g., a URL). At step 508, application 200 generates a content interaction. In various implementations, application 200 generates the content interaction in response to a user interaction with online content. For example, application 200 may generate a content interaction in response to a user watching a video content item 32. In various implementations, application 200 generates a content interaction based on one or more rules. For example, application 200 may generate a content interaction based on a threshold level of user interaction. As a concrete example, a video content item 32 may be displayed in a HTML iframe and application 200 may require that a threshold number of pixels of the iframe be rendered and visible to the user before generating a content interaction. In some implementations, application 200 generates the content interaction in response to a user interaction associated with content provider device 30. For example, a user may interact with a content item 32 associated with a content provider device 30 and then visit a website maintained by the content provider device 30, thereby triggering application 200 to generate a content interaction.

The content interaction may include content interaction data associated with client device 10, content publisher device 20, information resource 22, content provider device 30, content item 32, the online interaction, and/or any other information relating to the online content interaction. For example, the content interaction data may include a list of websites that the user visited before the content interaction was generated. In various implementations, the content interaction data includes identifier 34. Additionally or alternatively, the content interaction data may include an interaction type. For example, application 200 may determine and report that the content interaction was a view-through-conversion (VTC) or a click-through-conversion (CTC). In some implementations, application 200 implements anonymizing operations. For example, application 200 may add noise to the content interaction data. As a concrete example, application 200 may generate random content interactions (e.g., content interactions that never happened, etc.) and/or random content interaction data for existing content interactions (e.g., random content interaction data for content interactions that did happen, etc.). Though not shown in FIG. 3, in various implementations, application 200 transmits the content interaction data to first data processing system 300.

Referring now to FIG. 4, a method 600 of generating interaction data is shown, according to another implementation. In some implementations, method 600 is a detailed description of step 508 of method 500. At step 602, a user interacts with a content item 32 associated with a content provider device 30. For example, the user may interact with an advertisement for a toaster while on a social media website. In some implementations, interacting with the content item 32 includes viewing the content item 32. Additionally or alternatively, interacting with the content item 32 may include application 200 rendering the content item 32. At step 604, application 200 records an impression event. The impression event may include identifier 34. Additionally or alternatively, the impression event may include one or more additional identifiers. For example, the impression event may include a URL of content publisher device 20 and/or content provider device 30 associated with the content item 32. In some implementations, application 200 records the impression event in response to the content item 32 satisfying one or more visibility requirements. In various implementations, the impression event is stored by application 200 on client device 10. In some implementations, the impression event is transmitted to the content provider device 30 associated with the content item 32.

At step 606, the user interacts with the content provider device 30 associated with the content item 32. For example, the user may navigate to a website maintained by the content provider device 30. Additionally or alternatively, the user may interact with other online content provided by the content provider device 30. For example, the user may visit a third party online store and purchase an item associated with the content provider device 30. In various implementations, application 200 matches an identifier of the content provider device 30 with a recorded identifier to determine that the user has interacted with the content provider device 30. As a concrete example, application 200 may record a URL of the content provider device 30 and then determine if future websites that the user navigates to match the recorded URL. In some implementations, content provider device 30 transmits an indication to application 200 to determine that the user has interacted with the content provider device 30. As a concrete example, content provider device 30 may record an identifier of client device 10 and then determine if an identifier of future website visitors match the recorded identifier and transmit to the client device 10 an indication based on matching the identifiers.

At step 608, application 200 receives an interaction report request. In various implementations, application 200 receives the interaction report request from a source associated with the content provider device 30. For example, a website maintained by the content provider device 30 may transmit to application 200 the interaction report request. In various implementations, the interaction report request is transmitted in response to a user interaction with online content. For example, a user may receive a content item 32 and later visit a website associated with the content provider device 30 that provided the content item 32 and the website may determine that the user was served the content item 32 provided by the content provider device 30 and transmit an interaction report request to a client device 10 associated with the user. In various implementations, the interaction report request includes information associated with the online interaction as described above.

At step 610, application 200 transmit the interaction report. In various implementations, the interaction report includes identifier 34. Application 200 may transmit the interaction report to content provider device 30. Additionally or alternatively, application 200 may transmit the interaction report elsewhere. For example, application 200 may transmit the interaction report to a location specified by the interaction report request. In some implementations, application 200 transmits the interaction report to content publisher device 20. In some implementations, application 200 implements or facilitates an interface for requesting interaction reports. For example, outside entities may interact with application 200 using an API. As a concrete example, outside entities may query application 200 to receive interaction reports.

Referring now to FIGS. 5-15, an improved computer architecture for securely transmitting and correlating data from different entities using secret sharing is shown, according to various implementations. In brief overview, a secret sharing scheme may be implemented within the ESA architecture of system 110. For example, client device 10 may encrypt interaction data using a secret sharing scheme and transmit the generated secret shares to first data processing system 300. First data processing system 300 may receive secret shares from a number of client devices 10 and decrypt the secret shares once a threshold number has been received. Secret shares for which a threshold number are not received are inaccessible (e.g., cannot be decrypted), thereby enforcing minimum threshold cardinality restrictions.

Figure 5:
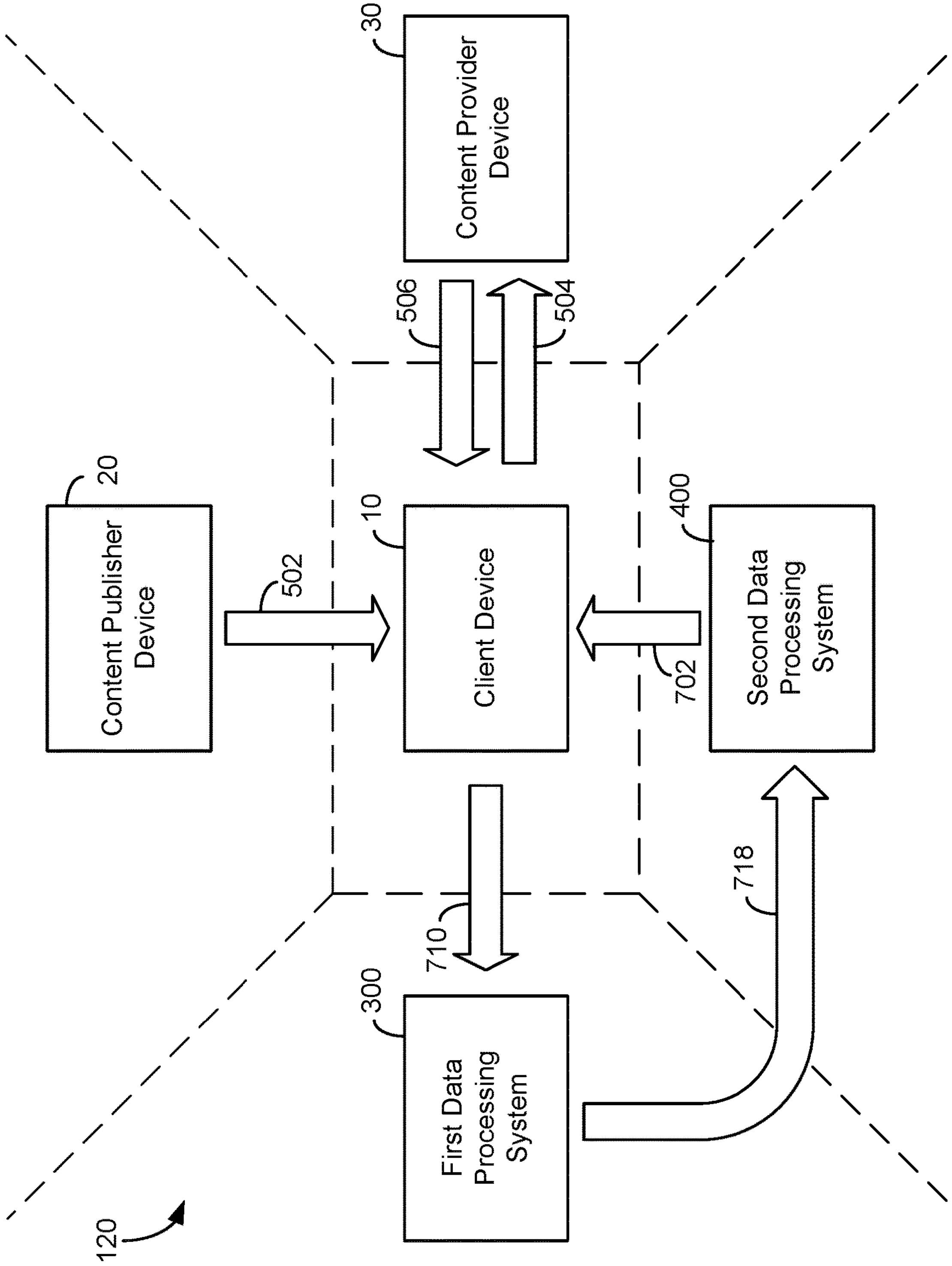
FIG. 5 is a diagram illustrating the ESA architecture of FIG. 2 including a secret sharing scheme, according to an illustrative implementation.

Referring now specifically to FIG. 5, a system 120 implementing a secret sharing scheme to encrypt interaction data is shown, according to an exemplary implementation. In various implementations, the secret sharing scheme is a Shamir secret sharing (SSS) algorithm. The SSS algorithm may be seeded. In some implementations, client device 10 produces a seed from the interaction data. For example, client device 10 may perform a hashing operation on the interaction data to deterministically produce a seed for the SSS algorithm. In various implementations, client device 10 and first data processing system 300 cooperatively perform the SSS algorithm. For example, client device 10 may implement an oblivious pseudorandom function (OPRF) with first data processing system 300 to produce a seed for the SSS algorithm. In some implementations, system 120 implements a verifiable secret sharing (VSS) algorithm to encrypt interaction data. For example, system 120 may implement the SSS algorithm with homomorphic encryption. As a concrete example, system 120 may implement a Feldman verifiable secret sharing (FVSS) algorithm.

In various implementations, system 120 performs steps 502-506 as described above. At step 702, second data processing system 400 sends an encryption key to client device 10. In various implementations, the encryption key is an asymmetric encryption public key. Client device 10 may asymmetrically encrypt interaction data using the received public key. Additionally or alternatively, client device 10 may encrypt the interaction data using the secret sharing scheme. In some implementations, client device 10 encrypts the asymmetrically encrypted interaction data using the secret sharing scheme. For example, client device 10 may first asymmetrically encrypt the interaction data using the received public key to generate encrypted interaction data and then encrypt the encrypted interaction data using the secret sharing scheme to generate a secret share. In various implementations, client device 10 generates a tag to identify the secret share. The tag may be used during decryption.

At step 710, client device 10 transmits the secret share to first data processing system 300. In some implementations, step 710 includes transmitting additional information. For example, client device 10 may transmit the tag and/or verification data. First data processing system 300 may receive secret shares from a number of client devices 10. In various implementations, first data processing system 300 waits until a threshold number of secret shares have been received before decrypting the secret shares. First data processing system 300 may decrypt the secret shares to recover the asymmetrically encrypted interaction data. In some implementations, the secret shares are decrypted in groups. For example, each secret share may be identified by a tag and secret shares having similar tags may be decrypted together. In various implementations, first data processing system 300 may shuffle the asymmetrically encrypted interaction data as described above.

At step 718, first data processing system 300 transmits the shuffled asymmetrically encrypted interaction data to second data processing system 400. Second data processing system 400 may asymmetrically decrypt the shuffled asymmetrically encrypted interaction data to recover the interaction data. In various implementations, second data processing system 400 analyzes the interaction data and produces aggregate information as described above.

Figure 6:
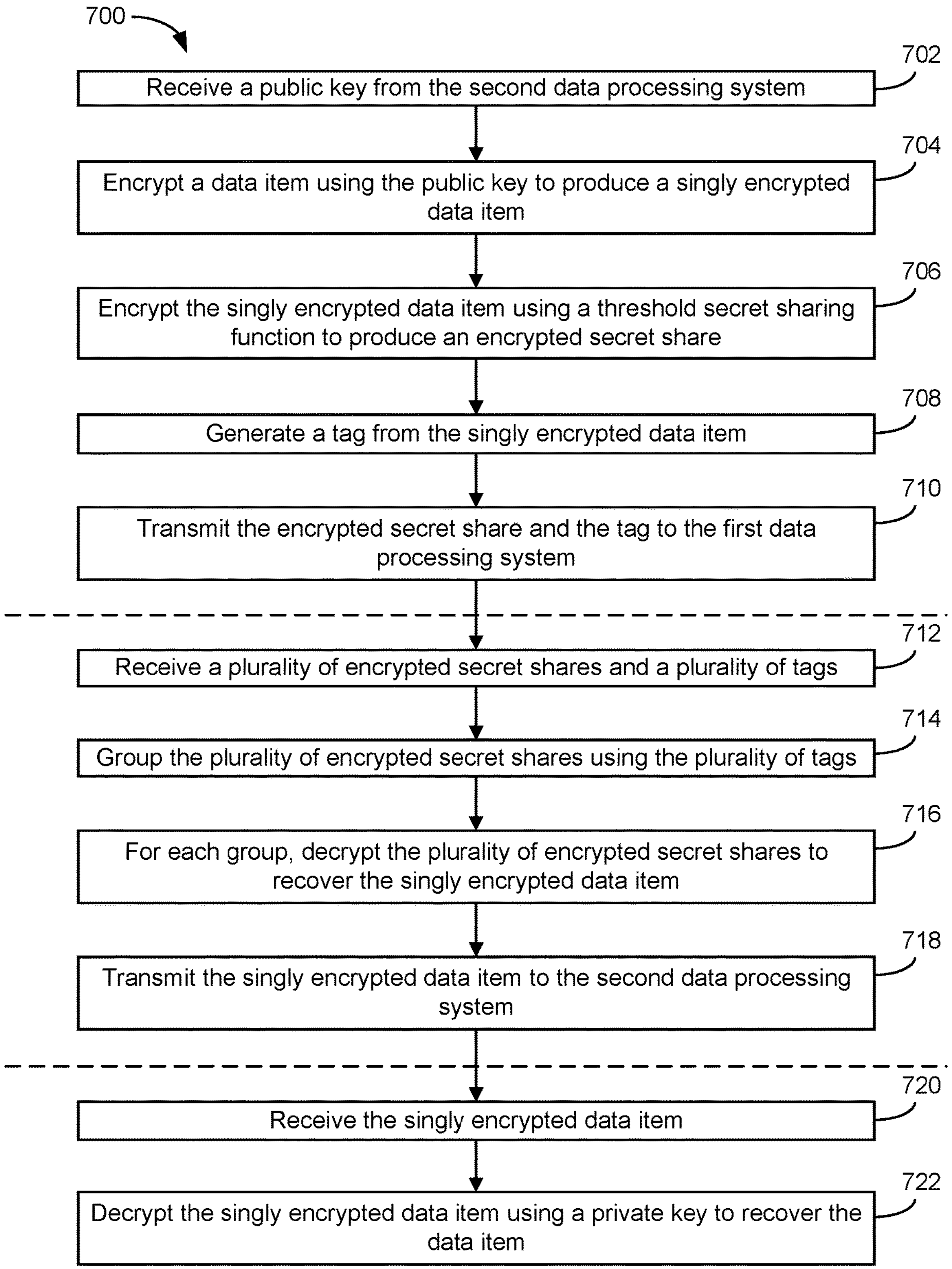
FIG. 6 is a flow diagram illustrating a method of secret sharing according to the secret sharing scheme of FIG. 5, according to an illustrative implementation.

Referring now to FIG. 6, a method 700 of performing secret sharing is shown, according to an implementation. In various implementations, system 120 performs method 700. In various implementations, method 700 is implemented as part of the ESA architecture. For example, the encoding and/or shuffling components of the ESA architecture may include method 700. In some implementations, method 700 is standalone (e.g., implemented separately of the ESA architecture). At step 702, client device 10 receives a public key from second data processing system 400. As described above, the public key may be an asymmetric encryption public key corresponding to an asymmetric encryption private key held by second data processing system 400. At step 704, client device 10 encrypts a data item using the public key to produce a singly encrypted data item. In various implementations, the data item is the interaction data described above with reference to FIGS. 3-4. At step 706, client device 10 encrypts the singly encrypted data item using a threshold encryption function to produce a secret share. In various implementations, the threshold encryption function is the SSS algorithm as described above. In some implementations, step 706 is performed cooperatively by client device 10 and first data processing system 300.

At step 708, client device 10 generates a tag from the singly encrypted data item. In various implementations, the tag identifies the secret share as part of a group. For example, singly encrypted data items encrypted using a threshold encryption function and a first seed may all share a first tag identifying them as a group while those encrypted using a second seed may all share a second tag. In various implementations, each group identified by the tags corresponds to an identifier 34. For example, a marketing campaign may include a number of content items 32 each having an identifier 34 identifying them as part of the marketing campaign. When an online interaction is generated in association with one of the content items 32 of the marketing campaign, the resulting secret share may include a tag identifying the secret share as part of the group associated with the marking campaign. At step 710, client device 10 transmits the secret share and the tag to first data processing system 300.

At step 712, first data processing system 300 receives a number of secret shares and a number of tags. Each of the number of secret shares and tags may be received from a different client device 10. Additionally or alternatively, a single client device 10 may send many secret shares and accompanying tags. At step 714, first data processing system 300 groups the number of secret shares using the number of tags. For example, a first secret share having a first tag indicating a first group may be grouped with a second secret share having a second tag indicating the first group while a third secret share having a third tag indicating a second group may be grouped by itself.

At step 716, for each group, first data processing system 300 decrypts the number of secret shares to recover the singly encrypted data items. In various implementations, first data processing system 300 decrypts the number of secret shares using polynomial interpolation. At step 718, first data processing system 300 transmits the singly encrypted data items to second data processing system 400. In various implementations, the singly encrypted data items are devoid of PII when transmitted to second data processing system 400.

At step 720, second data processing system 400 receives the singly encrypted data items. At step 722, second data processing system 400 decrypts the singly encrypted data using a private key to recover the data items. In various implementations, the decryption is asymmetric decryption. In various implementations, the private key is an asymmetric encryption private key corresponding to the asymmetric encryption public key above.

Figure 6A:
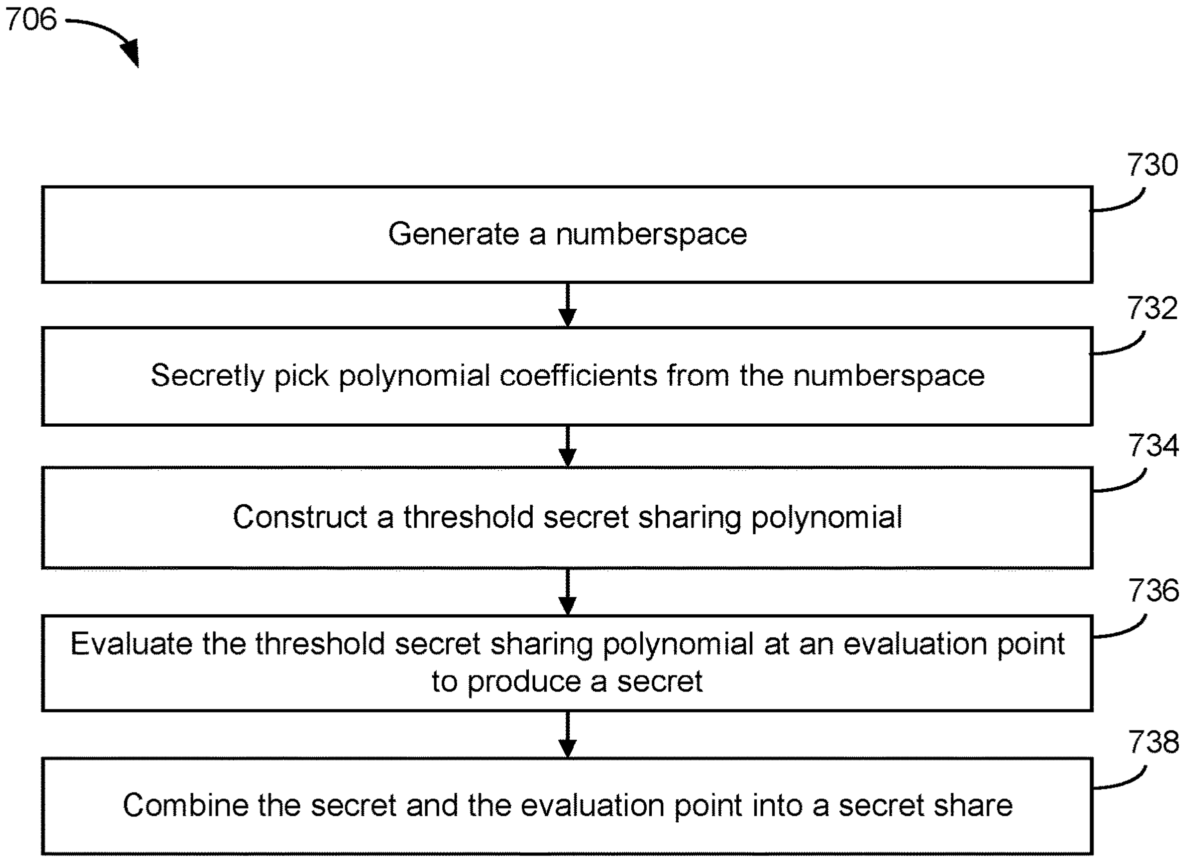
FIG. 6A is a flow diagram illustrating a method of generating a secret share according to the secret sharing method of FIG. 6, according to an illustrative implementation.

Referring now to FIG. 6A, step 706 of encrypting the singly encrypted data item using a threshold encryption function is shown in detail, according to an implementation. In various implementations, the singly encrypted data item is encrypted using a SSS algorithm. However, it should be understood that other secret sharing schemes are possible. Furthermore, it should be understood that while FIG. 6A is described in relation to client device 10, any component of system 120 may be involved in step 706.

In brief summary, a (k, n) SSS algorithm encrypts a secret S (e.g., interaction data) by producing n secret shares such that any subset of k secret shares is sufficient to recover the secret S. To do so, a polynomial f(x) of degree k−1 is built. For example, f(x) may take the form of:

$$f(x) = a_0 + a_1x + a_2x^2 + a_3x^3 + \ldots + a_{k-1}x^{k-1}$$

where $a_1, \ldots, a_{k-1}$ are randomly chosen positive integers such that $a_i<P$ where P is a prime number such that a size of P is greater than a size of S and where $a_0=S$. f(x) is evaluated at n points to produce n secret shares (i, f(i)) where i is the evaluation point. To recover S, k secret shares (i, f(i)) are combined using polynomial interpolation to recover f(x) where the constant term $a_0$ is the secret S.

At step 730, client device 10 generates a numberspace. Additionally or alternatively, another component of system 120 may generate or facilitate generation of the numberspace. For example, first data processing system 300 may collaboratively interact with client device 10 to generate the numberspace. In some implementations, the numberspace is domain restricted. For example, the numberspace may be a finite field F of size P where P is a prime number such that P is greater than a size of S. In some implementations, the numberspace is generated randomly (e.g., a random numberspace satisfying the domain restrictions is selected, etc.). In some implementations, the numberspace is predetermined.

At step 732, client device 10 secretly picks polynomial coefficients $a_1, \ldots, a_{k-1}$ from the numberspace. In some implementations, k is predetermined. Additionally or alternatively, k may be determined dynamically. For example, client device 10 may determine k based on the type of data being encrypted. As a concrete example, certain data may use k=10,000,000 while minimally revealing data may use k=100,000. In some implementations, another component of system 120 facilitates or implements picking polynomial coefficients. For example, first data processing system 300 may collaboratively interact with client device 10 to pick the polynomial coefficients.

At step 734, client device 10 constructs the threshold secret sharing polynomial. In various implementations, step 734 includes constructing f(x). For example, client device 10 may combine the polynomial coefficients with the singly encrypted data item to produce f(x). At step 736, client device 10 evaluates the threshold secret sharing polynomial f(x) at an evaluation point to produce a secret. In various implementations, the secret is f(i). In some implementations, the evaluation point is random. Additionally or alternatively, system 120 may dynamically determine the evaluation point. For example, each unique client device 10 may use a unique evaluation point determined using a pseudorandom function. At step 738, client device 10 combines the secret and the evaluation point into a secret share. In various implementations, the secret share is the tuple (i, f (i)). The tuple (i=0, f(0)) is not a valid secret share (e.g., the evaluation point is never equal to zero).

Figure 7:
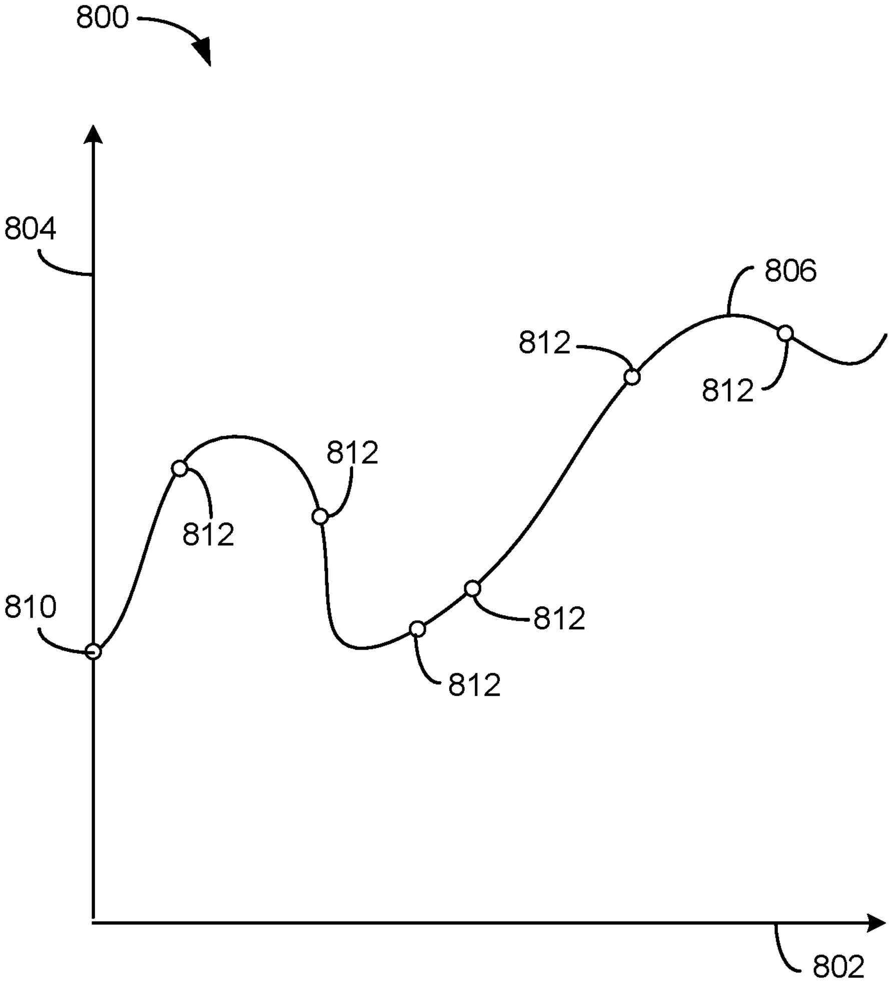
FIG. 7 is a diagram illustrating a threshold secret sharing polynomial according to the secret sharing method of FIG. 6, according to an illustrative implementation.

Referring now to FIG. 7, a graph 800 illustrating threshold secret sharing polynomial 806 is shown, according to an implementation. Polynomial 806 may correspond to f(x). Polynomial 806 may exist in a field F defined by x-domain 802 and y-domain 804. In various implementations, x-domain 802 and/or y-domain 804 are domain restricted. For example, x-domain 802 and y-domain 804 may be finite fields constructed from integers modulo P. As a concrete example, x-domain 802 and y-domain 804 may be finite fields constructed from integers modulo P where $P=2^{160}+7$. Polynomial 806 may include a number of points 810-812. As described above, point 810 may be a secret S. In various implementations, point 810 is the singly encrypted data item. However, other secrets are possible. Points 812 may be the polynomial coefficients described above. During recovery of S, one or more of points 812 may be received and combined using polynomial interpolation to recover polynomial 806. It should be understood that other recovery operations are possible.

Figure 8:
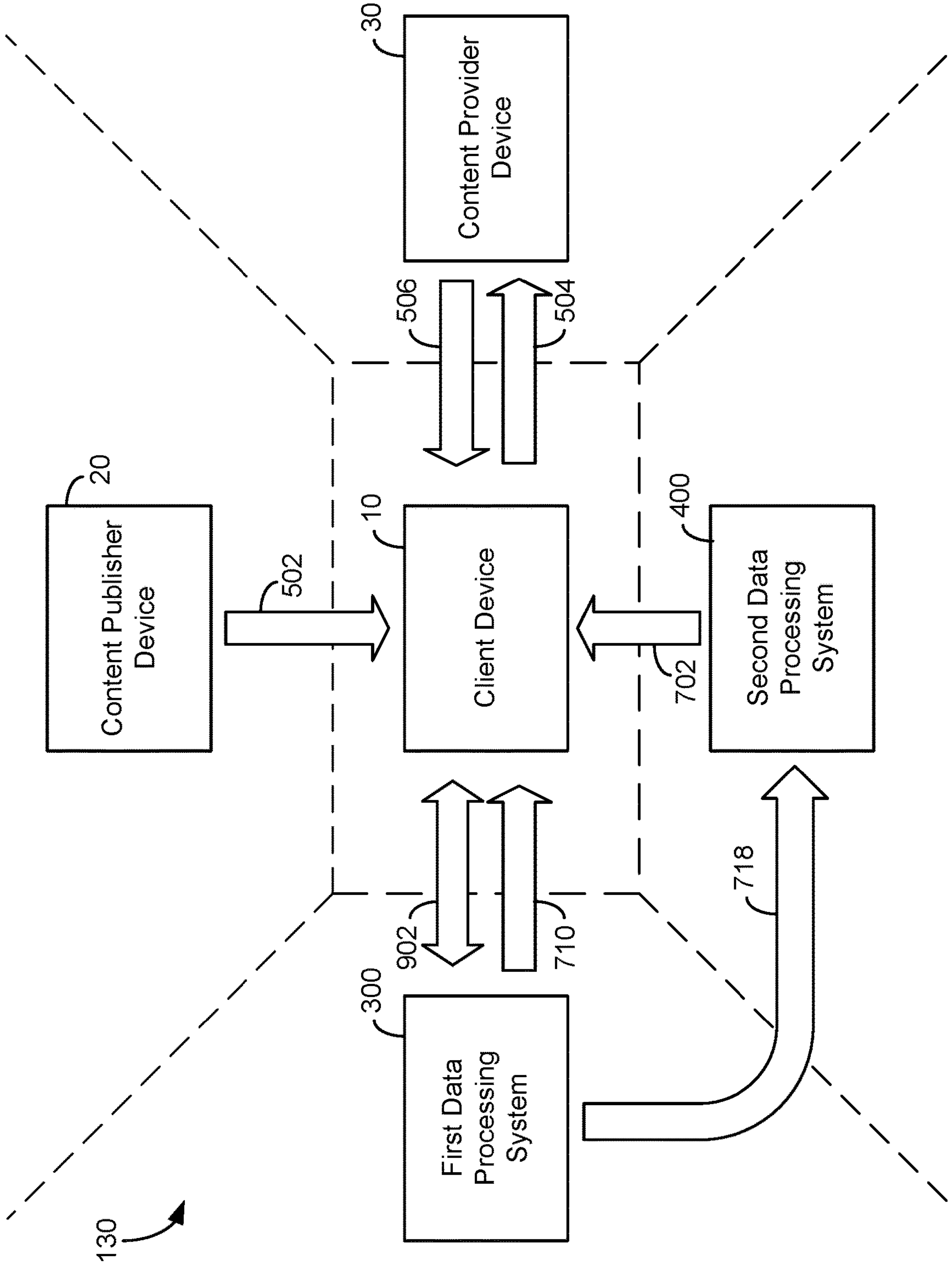
FIG. 8 is a diagram illustrating the secret sharing scheme of FIG. 5 including a deterministic seed, according to an illustrative implementation.

Referring now to FIG. 8, a system 130 implementing a secret sharing scheme including a deterministic seed to encrypt interaction data is shown, according to an implementation. In various implementations, system 130 performs steps 502-506 as described above. System 130 may implement the secret sharing scheme described above with the inclusion of a deterministic seed. In brief summary, a deterministic seed is a seed generated deterministically from source data (e.g., interaction data, etc.) and used as part of the secret sharing scheme.

A secret sharing scheme including a deterministic seed offers many benefits over existing systems. In some implementations, securely transmitting and correlating data includes coarsening data by adding noise to the data. For example, a system may add random Gaussian noise to user data, intermediate values, or the final output thereby making statistical inference insensitive to user data (e.g., statistical inference does not reveal PII). However, the addition of noise causes an increase in the standard deviation of the data, thereby requiring a larger sample size to achieve statistically confident results. For example, adding noise to user data may, in best case, increase the magnitude of the standard deviation by the square root of the report count V/F. As a concrete example, if data from a billion users are analyzed, then a common signal from even up to a million users may be missed. Therefore, systems that rely on adding noise are best suited for measuring frequent elements from peaky power-law distributions. However, the unique cryptography and computer architecture methodologies described herein may facilitate secure transmission and correlation of data without requiring huge sample sizes while protecting PII. Specifically, the systems and methods described herein may securely transmit and correlate data regarding uncommon messages (e.g., high min-entropy messages, etc.) without adding noise and thereby requiring far smaller sample sizes than existing system. Therefore, the systems and methods of the present disclosure may more easily measure low-occurrence events. For example, collecting analytics on a rarely visited website. Furthermore, the systems and methods of the present disclosure may facilitate granular analysis of data while protecting PII. For example, data having a specific attribute (e.g., associated with a rarely visited website, etc.) may be tagged before being securely transmitted. The tagged data may then be analyzed as a group, thereby facilitating a higher sensitivity to common signals relating to the specific attribute than analysis performed on general data (e.g., a mix of data having the specific attribute and data not having the specific attribute). For example, a content publisher may wish to know what API's are used by mobile phones when visiting a website maintained by the content publisher. Furthermore, the website may have a far higher proportion of desktop visitors than mobile phone visitors. Therefore, collection and analysis of general data (e.g., data including desktop visitors and mobile phone visitors) may miss many of the API's used by mobile phone visitors because the mobile phone data is washed out by the desktop data. However, systems and methods of the present disclosure may tag the desktop data as desktop data and the mobile phone data as mobile phone data before securely transmitting and analyzing the data. Therefore, the mobile phone data may be analyzed separately, preserving statistical information regarding mobile phone API usage.

One implementation may include a secret sharing scheme including a deterministic seed generated using interaction data. For example, a deterministic seed may be deterministically generated using interaction data and the deterministic seed may be used as an input to the secret sharing scheme. In various implementations, the deterministic seed may be generated by inputting the interaction data into a hash function.

Another implementation may include a secret sharing scheme including a deterministic seed generated using an OPRF protocol. For example, a deterministic seed may be deterministically generated by engaging in a pseudorandom function using the interaction data, and the deterministic seed may be used as an input to the secret sharing scheme. In various implementations, client device 10 engages in the OPRF protocol with first data processing system 300. For example, client device 10 may hash interaction data and send the hashed interaction data to first data processing system 300. First data processing system 300 may hash the received data and send it back to client device 10 for input to the secret sharing scheme. In some implementations, the deterministic seed is a master key generated by first data processing system 300. In some implementations, the hashing function used is a slow hash function. For example, a master key may be generated using a Scrypt slow hash function.

Another implementation may include binding an identifier to interaction data and deterministically generating a deterministic seed based on the interaction data and the bound identifier. For example, a private ID and/or a group ID, as described above, may be bound to interaction data. Binding an identifier to interaction data may facilitate enforcing minimum threshold cardinality restrictions. In various implementations, client device 10 determines an identifier and appends the identifier to interaction data. Client device 10 may hash the interaction data and appended identifier to produce a deterministic seed that may be used as an input to the secret sharing scheme.

Another implementation may include a verifiable secret sharing scheme including a deterministic seed generated using interaction data. For example, a deterministic seed may be deterministically generated using interaction data and the deterministic seed may be used as an input to the secret sharing scheme. Secret shares may then be verified (e.g., authenticated). As a concrete example, client device 10 may engage in an OPRF protocol with first data processing system 300 to produce a deterministic seed. Client device 10 may use the deterministic seed as input to the secret sharing scheme to produce secret shares. First data processing system 300 may verify the secret shares to ensure their authenticity (e.g., that they have not been tampered with, etc.).

Still referring to FIG. 8, client device 10 may generate interaction data. At step 702, second data processing system 400 may transmit an asymmetric encryption public key to client device 10. In various implementations, client device 10 may asymmetrically encrypt the interaction data using the public key to produce singly encrypted data. In various implementations, client device 10 generates a deterministic seed based on the interaction data. For example, client device 10 may hash the interaction data to produce a deterministic seed. Additionally or alternatively, client device 10 may collaboratively interact with first data processing system 300 to produce the deterministic seed (e.g., step 902). For example, client device 10 may engage in an OPRF protocol with first data processing system 300 to produce a deterministic seed. Client device 10 may use the deterministic seed as input to a secret sharing scheme to produce a secret share. Additionally or alternatively, client device 10 may generate a deterministic seed based on the singly encrypted data. In some implementations, client device 10 may generate a tag as described above. At step 710, client device 10 transmits the secret share and/or the tag to first data processing system 300. First data processing system 300 may perform various anonymizing operations as described above to anonymize the received data. In various implementations, first data processing system decrypts a number of received secret shares using polynomial interpolation as described above. In some implementations, second data processing system 400 decrypts the number of received secret shares instead of first data processing system 300. At step 718, first data processing system 300 transmits the unencrypted data to second data processing system 400 where it can be analyzed to produce aggregate information as described above. In some implementations, first data processing system 300 transmits the number of secret shares to second data processing system 400 and second data processing system 400 decrypts the received number of secret shares.

Figure 9:
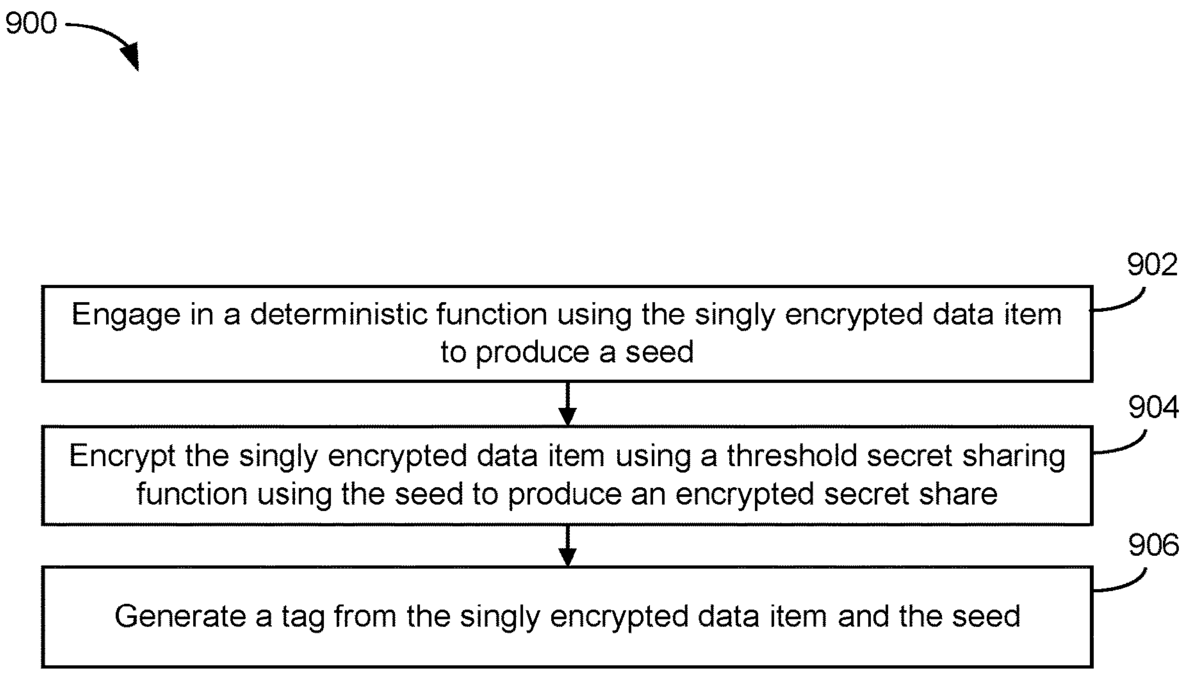
FIG. 9 is a flow diagram illustrating a method of generating a secret share using a deterministic seed according to the secret sharing scheme of FIG. 8, according to an illustrative implementation.

Referring now to FIG. 9, a method 900 of implementing a secret sharing scheme using a deterministic seed to encrypt interaction data is shown, according to an implementation. In various implementations, system 130 performs method 900. In some implementations, the ESA architecture described above includes method 900. For example, the encoding and shuffling steps of the ESA architecture may include method 900. At step 902, client device 10 engages in a deterministic function to produce a deterministic seed. In various implementations, client device 10 uses a singly encrypted data item to produce the deterministic seed, as described above. As a non-limiting example, client device 10 may append an identifier to a singly encrypted data item produced by asymmetrically encrypting interaction data and hash the singly encrypted data item and appended identifier to produce a deterministic seed. At step 904, client device 10 encrypts the singly encrypted data item using a threshold encryption function and the deterministic seed to produce a secret share. At step 906, client device 10 generates a tag from the singly encrypted data item and the deterministic seed. For example, client device 10 may append the deterministic seed to the singly encrypted data item and may hash the combination to produce a tag. Additionally or alternatively, client device 10 may append an identifier (e.g., private ID, group ID, etc.) to the singly encrypted data item and may hash the combination to produce a tag.

Figure 9A:
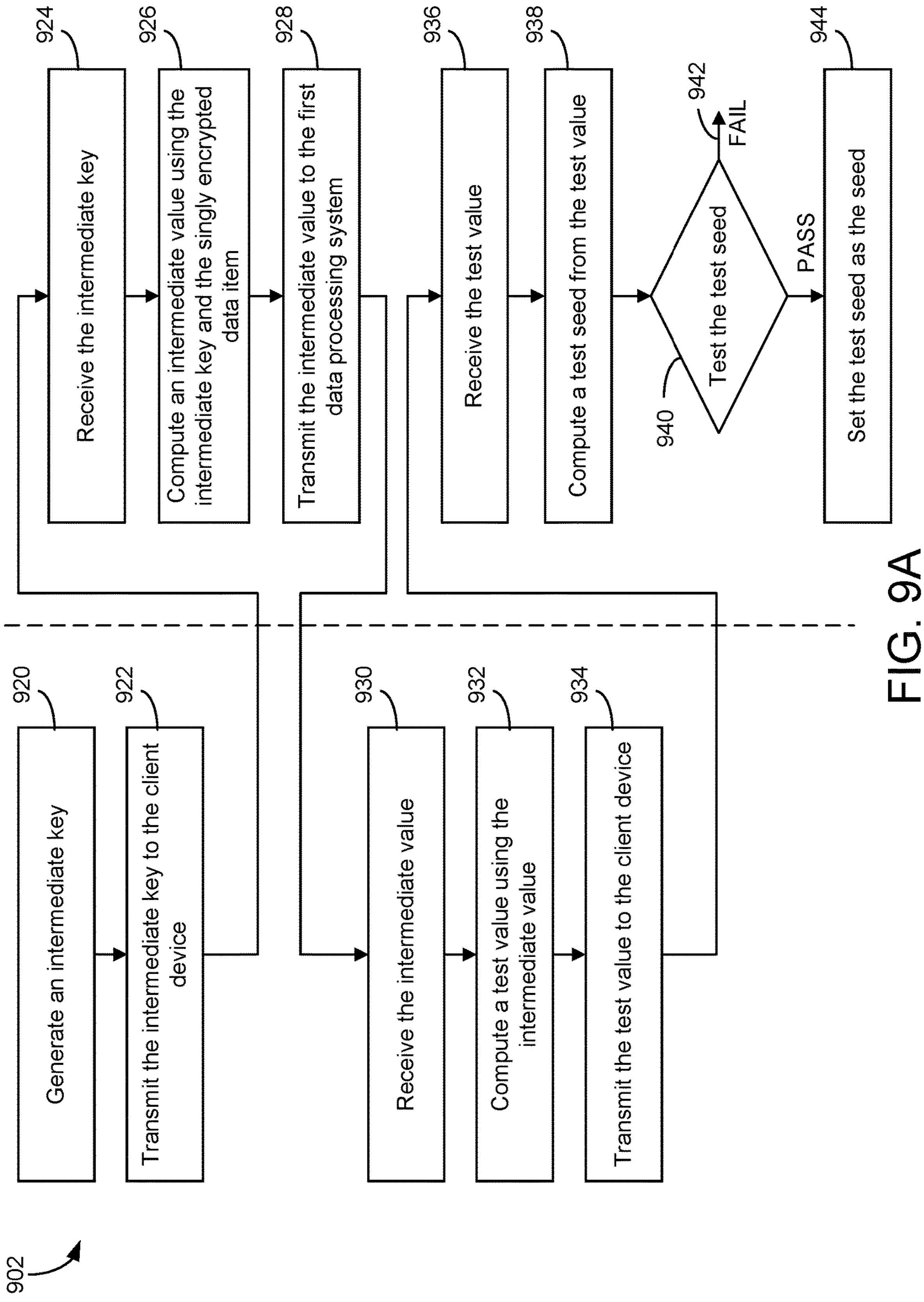
FIG. 9A is a flow diagram illustrating a method of generating a verifiable secret share using a deterministic seed according to the secret sharing scheme of FIG. 8, according to an illustrative implementation.

Referring now to FIG. 9A, step 902 using a VSS algorithm is shown, according to an implementation. In some implementations, the VSS algorithm is a verifiable threshold signature algorithm. At step 920, first data processing system 300 generates an intermediate key. The intermediate key may be a RSA public key. For example, first data processing system 300 may generate a public key (N, e) where N is the product of two prime numbers $p_1$, $p_2$ and e is an RSA exponent. e may be chosen such that $1<e<\varphi$ and the greatest common divisor of e and $\varphi$ is one, where $\varphi=(p_1-1)(p_2-1)$. At step 922, first data processing system 300 transmits the intermediate key to client device 10.

At step 924, client device 10 receives the intermediate key. At step 926, client device 10 computes an intermediate value using the intermediate key and the singly encrypted data item. The intermediate value may be computed as:

$$\rho = (r * G1(m))^e \bmod (N)$$

where ρ is the intermediate value, r is a random value, G1( ) is a hash function, and m is the singly encrypted data item. In various implementations, r is chosen from integers modulo N. At step 928, client device 10 transmits the intermediate value ρ to first data processing system 300.

At step 930, first data processing system 300 receives the intermediate value ρ. At step 932, first data processing system 300 computes a test value using the intermediate value ρ. The test value may be computed as:

$$\gamma = \rho^d \bmod (N)$$

where γ is the test value and d is a RSA secret exponent. d may be computed as:

$$d = \frac{2\varphi + 1}{e}$$

where d is chosen such that $1<d<\varphi$ and $e*d=\mathrm{mod}(\varphi)$. In some implementations, d is of a specified length (e.g., 2048-bits). At step 934, first data processing system 300 transmits the test value γ to client device 10.

At step 936, client device 10 receives the test value γ. At step 938, client device 10 computes a test seed from the test value γ. The test seed may be computed as:

$$\tau = \left(\frac{\gamma}{r} \bmod (N)\right)^{e} \bmod (N)$$

where τ is the test seed. At step 940, client device 10 tests the test seed τ. Testing τ may include computing $\tau \stackrel{?}{=} G1(m)$. If the test seed fails (e.g., τ≠G1(*m*)) then client device 10 does not set the test seed τ as the deterministic seed (e.g., step 942). If the test seed passes (e.g., τ=G1(*m*)) then client device 10 sets the test seed τ as the deterministic seed (e.g., step 944). In various implementations, step 944 includes computing θ=G2(*r*) where θ is the deterministic seed and G2) is a hash function (e.g., the deterministic seed is the result of hashing τ).

Figure 10:
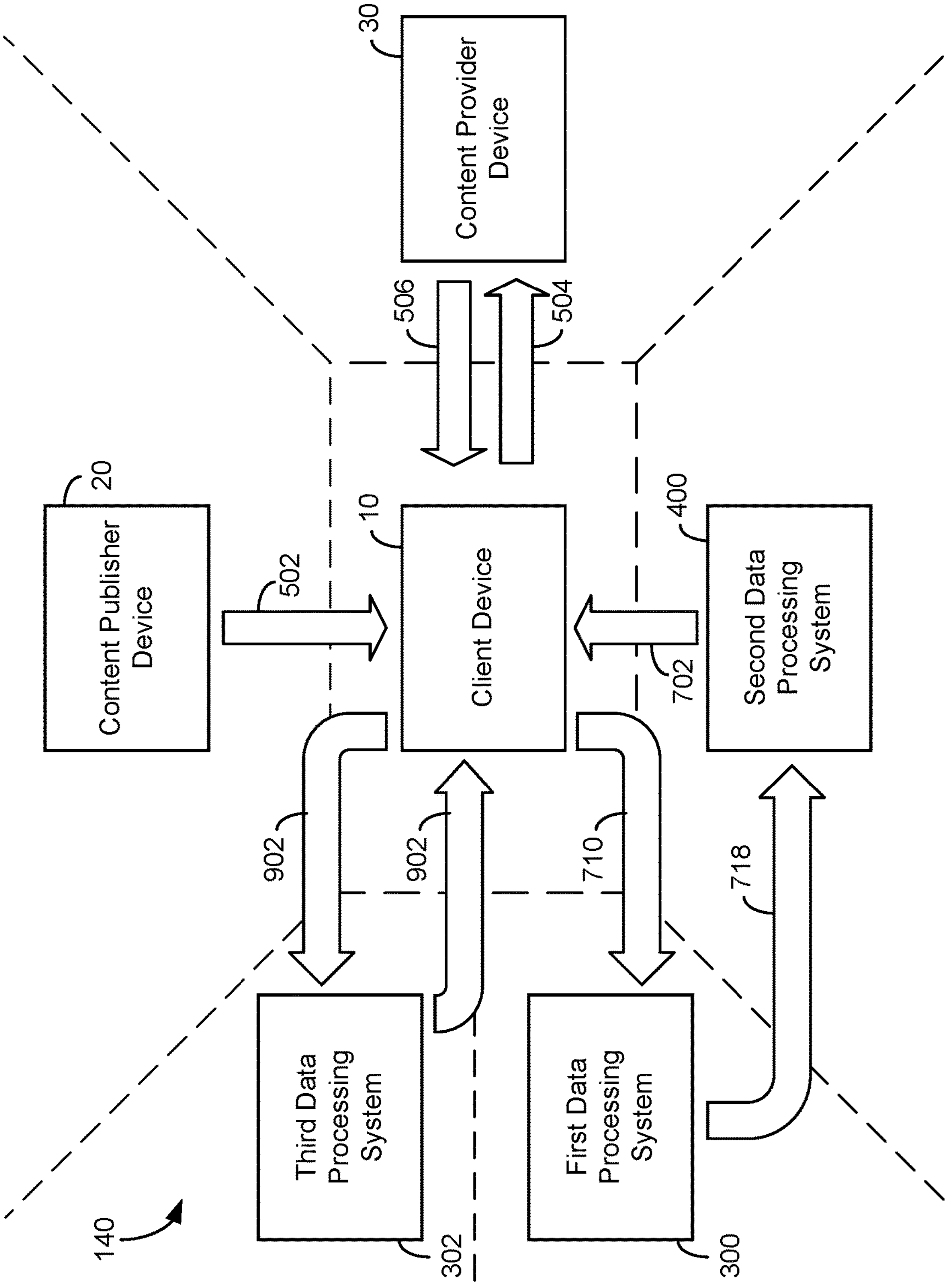
FIG. 10 is a diagram illustrating the secret sharing scheme of FIG. 8 including a third data processing system, according to an illustrative implementation.

Referring now to FIG. 10, a system 140 implementing a secret sharing scheme including a deterministic seed to encrypt interaction data using a third data processing system 302 is shown, according to an implementation. System 140 may be similar to those described herein (e.g., system 110, system 120, system 130, etc.) but may split ESA shuffling operations and deterministic seed generation between first data processing system 300 and third data processing system 302. For example, client device 10 may engage in an OPRF protocol with third data processing system 302 as described above. Client device 10 may send secret shares to first data processing system 300, and first data processing system 300 may perform shuffling operations as described above before transmitting the shuffled data to second data processing system 400 for analysis. By splitting ESA shuffling operations and deterministic seed generation between first data processing system 300 and third data processing system 302, system 140 limits the amount of information each party (e.g., first data processing system 300, third data processing system 302) may learn about received data, thereby further protecting PII. Furthermore, system 140 protects against malicious parties and/or compromised parties (e.g., first data processing system 300) by reducing discrete access to data, thereby increasing system redundancy and robustness.

At step 902, client device 10 may engage in an OPRF protocol with third data processing system 302. Third data processing system 302 may share the features of first data processing system 300 described herein. In various implementations, third data processing system 302 is separate of first data processing system 300 (e.g., neither third data processing system 302 nor first data processing system 300 may access each other or data related to each other, etc.). In some implementations, third data processing system 302 and first data processing system 300 exist as isolated environments in the same system. For example, third data processing system 302 and first data processing system 300 may be software guard extension enclaves within the memory of a server. Client device 10 may encrypt interaction data and/or singly encrypted data items using the seed generated cooperatively with third data processing system 302 to generate a secret share. At step 710, client device 710 transmits the secret share to first data processing system 300. As described above, first data processing system 300 may decrypt, shuffle, and transmit the received data to second data processing system 400 which analyzes the transmitted data to produce aggregate results.

Figure 11:
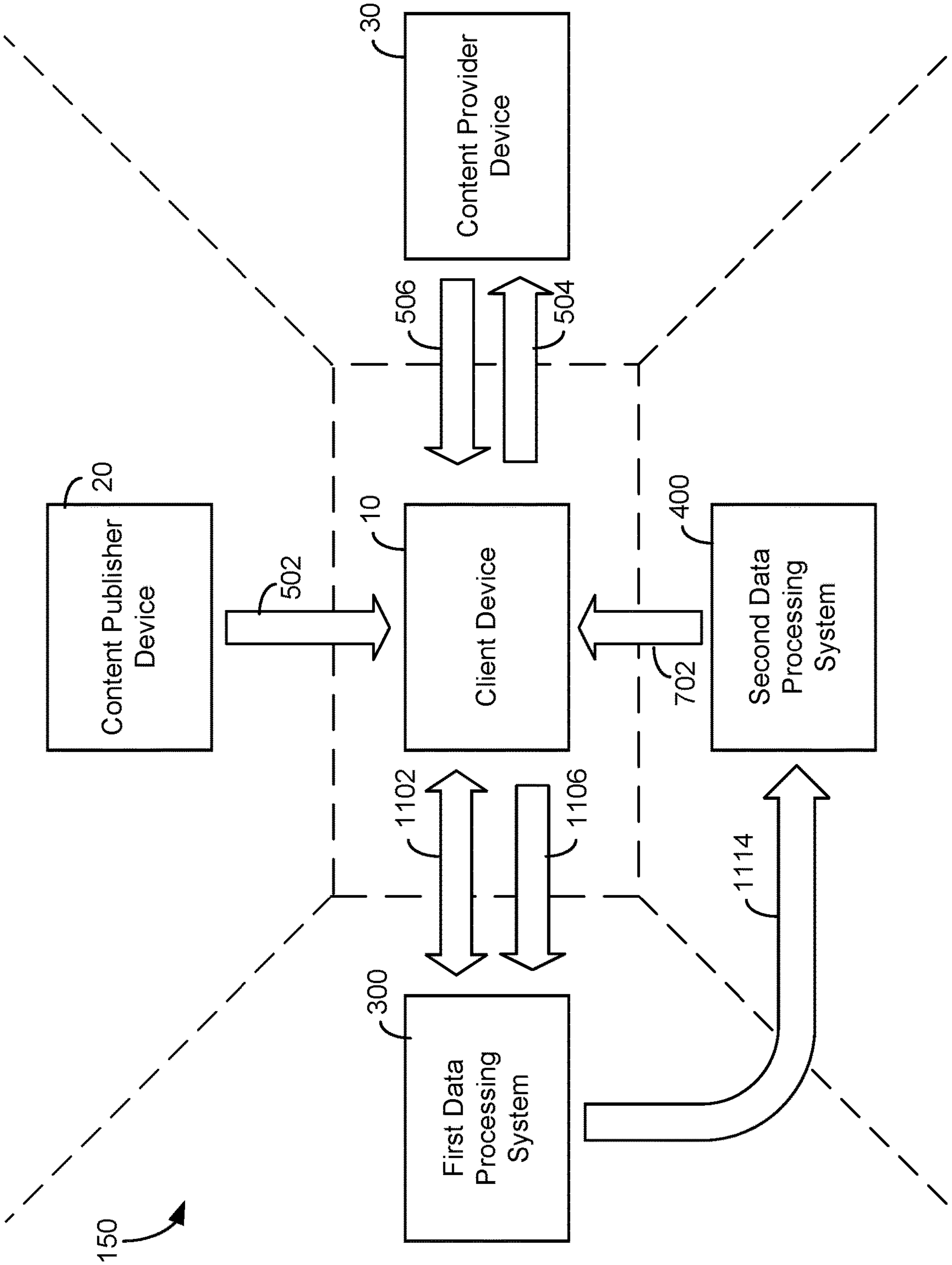
FIG. 11 is a diagram illustrating secure transfer and correlation of interaction data, according to an illustrative implementation.
Figure 12:
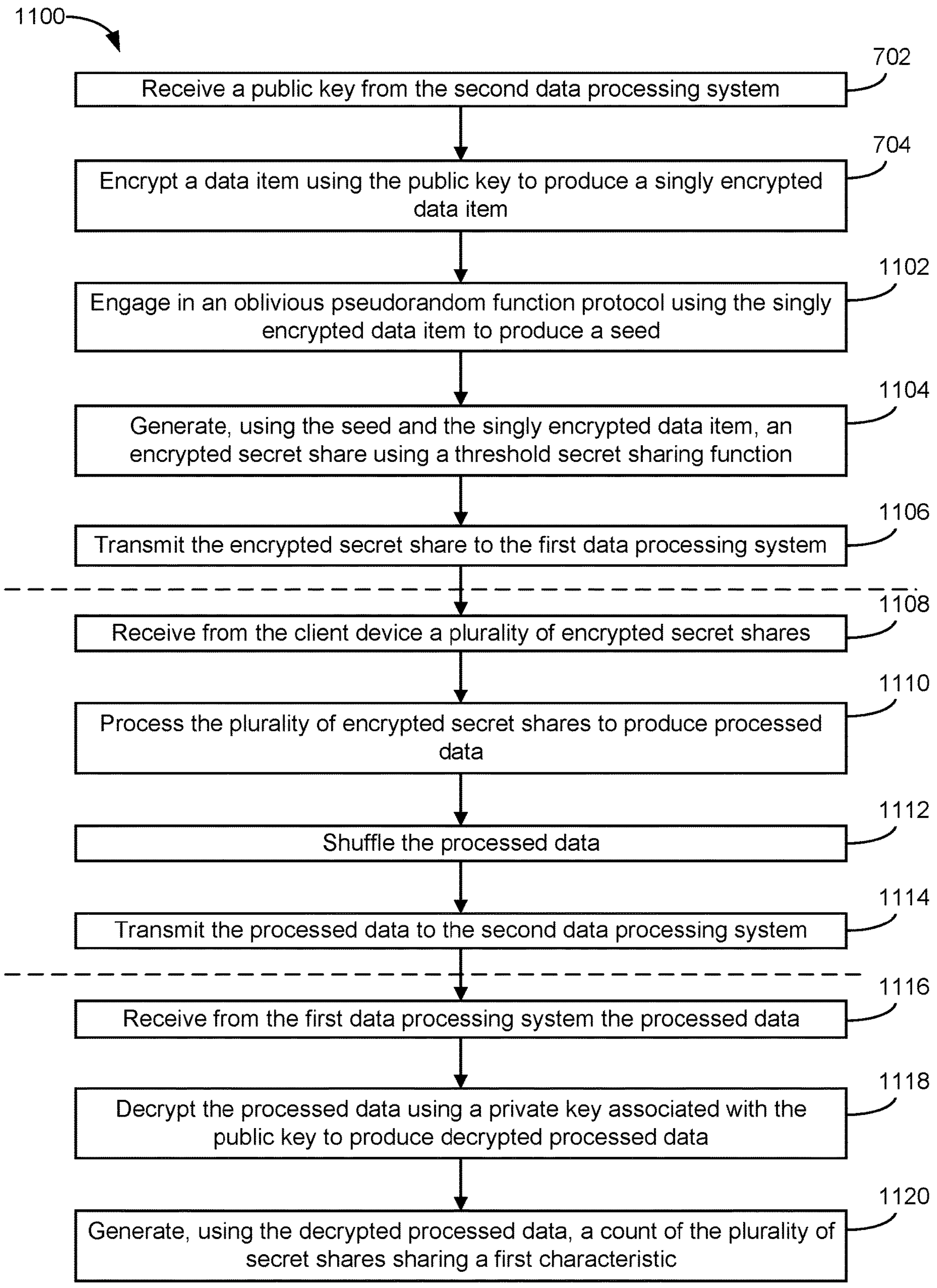
FIG. 12 is a flow diagram illustrating a method of secure transfer and correlation of interaction data according to the system of FIG. 11, according to an illustrative implementation.
Figure 13:
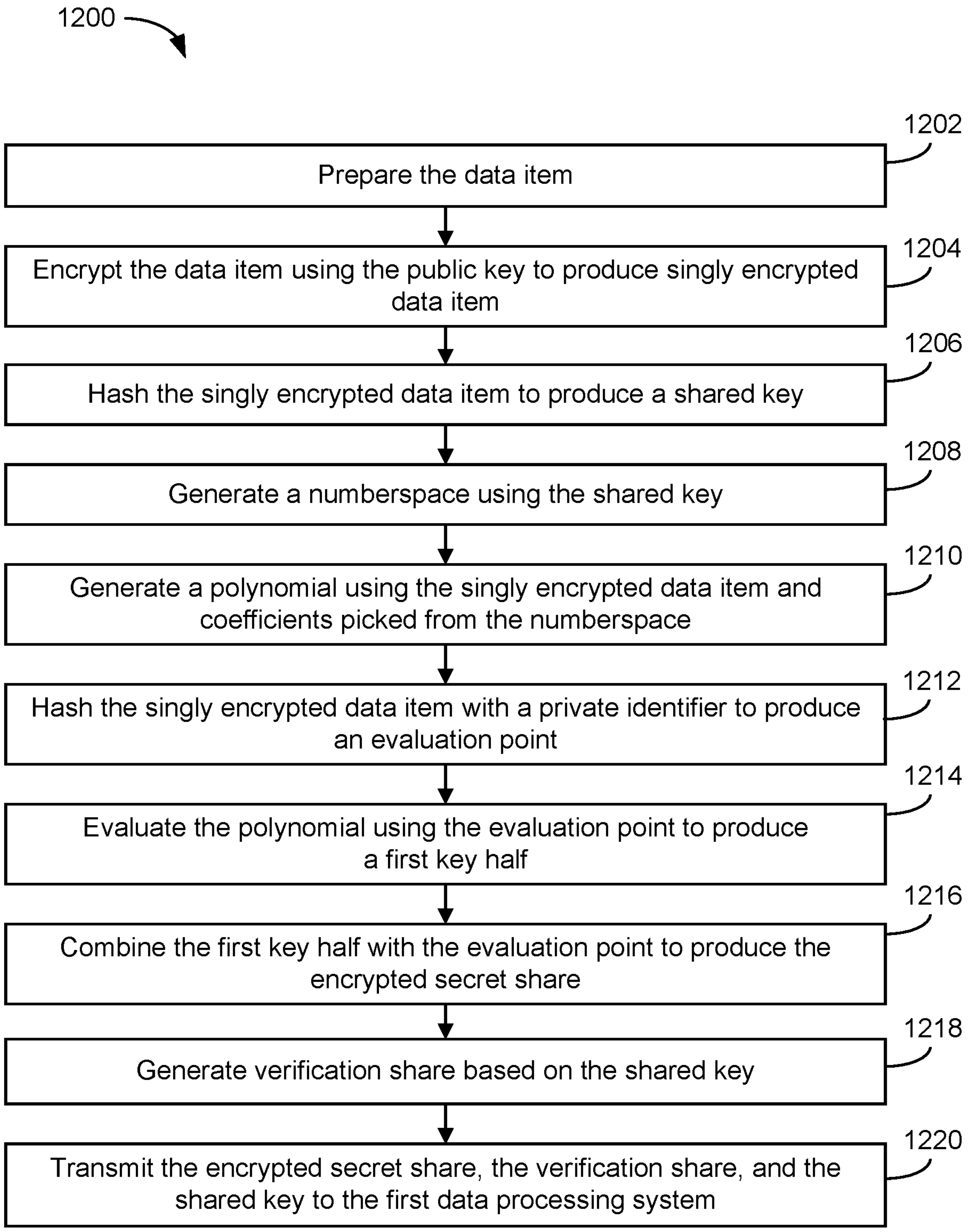
FIG. 13, is a flow diagram illustrating the method of FIG. 12 using a verifiable secret sharing scheme, according to an illustrative implementation.
Figure 14:
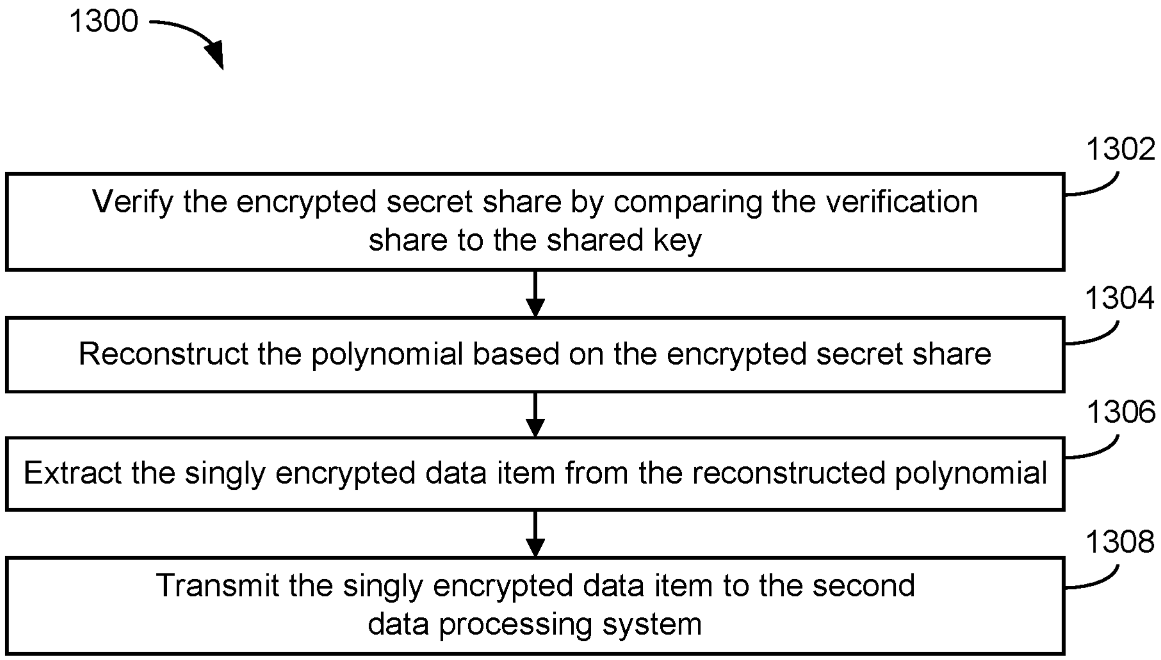
FIG. 14, is a flow diagram illustrating the method of FIG. 12 verifying the verifiable secret share, according to an illustrative implementation.

Referring now to FIGS. 11-14, a non-limiting exemplary implementation of secure transfer and correlation of interaction data using an OPRF protocol and deterministic seed are shown. In brief overview, FIG. 11 illustrates a system 150 for securely transferring and correlating interaction data using an OPRF protocol and deterministic seed. System 150 may be similar to those described herein (e.g., system 110, system 120, system 130, system 140, etc.). FIG. 12 illustrates a method 1100 of securely transferring and correlating interaction data as implemented by system 150. FIG. 13 illustrates a method 1200 of generating verifiable secret shares as implemented by system 150. FIG. 14 illustrates a method 1300 of verifying and decrypting the verifiable secret shares as implemented by system 150.

Referring now specifically to FIGS. 11-12, steps 502-506 may be performed as described in detail above. In various implementations, content interaction circuit 230 generates interaction data. Furthermore, private ID circuit 210 and/or group ID circuit 220 may produce one or more private ID's and/or group ID's associated with the interaction data. At step 702, second data processing system 400 may transmit an asymmetric encryption public key to client device 10. In various implementations, decryption circuit 444 generates the asymmetric encryption public key. At step 704, client device 10 encrypts the interaction data to produce singly encrypted data items. In various implementations, first encryption circuit 244 encrypts the interaction data. Additionally or alternatively, first encryption circuit 244 and hashing circuit 242 may interact to encrypt the interaction data. For example, encryption circuit 244 may generate hashed values used during encryption via hashing circuit 242. At step 1102, client device 10 engages in an OPRF protocol with first data processing system 300 to produce a deterministic seed. In various implementations, second encryption circuit 246 and OPRF circuit 332 interact to perform the OPRF protocol. At step 1104, client device 10 encrypts the singly encrypted data item using the deterministic seed to produce a secret share. In various implementations, second encryption circuit 246 encrypts the singly encrypted data items using the deterministic seed to produce the secret share. At step 1106, client device 10 transmits the secret share to first data processing system 300.

At step 1108, first data processing system 300 receives a number of secret shares. In various implementations, first data processing system 300 receives the number of secret shares from a number of client devices 10. At step 1110, first data processing system 300 processes the number of secret shares to produce processed data. In various implementations, decryption circuit 336 decrypts the number of secret shares to produce the processed data. In various implementations, the processed data is singly encrypted data items for which a threshold number of secret shares were received. At step 1112, first data processing system 300 shuffles the processed data. In various implementations, shuffle circuit 338 shuffles the processed data. In various implementations, shuffle circuit 338 shuffles the processed data by rearranging an order of the processed data and/or intermingling processed data from different groups. At step 1114, first data processing system 300 transmits the processed data to second data processing system 400.

At step 1116, second data processing system 400 receives the processed data. At step 1118, second data processing system 400 decrypts the processed data using an asymmetric encryption private key corresponding with the asymmetric encryption public key transmitted during step 702 to produce decrypted processed data. In various implementations, decryption circuit 444 decrypts the processed data. In various implementations, the decrypted processed data includes interaction data for which a threshold number of secret shares were received. The decrypted processed data may be devoid of PII. At step 1120, second data processing system 400 generates aggregate information based on the decrypted processed data. In various implementations, analysis circuit 442 performs various analysis operations to produce the aggregate information. In various implementations, the aggregate information includes a count of the number of secret shares sharing a first characteristic. Additionally or alternatively, the aggregate information may include a sum of interactions (e.g., transactions, clicks, phone calls, etc.), a sum of the value associated with each interaction (e.g., a dollar amount), and/or metadata. In some implementations, the aggregate information may be saved in database 410.

Referring now specifically to FIG. 13, the method 1200 of generating verifiable secret shares as implemented by system 150 is shown, according to an implementation. At step 1202, content interaction circuit 230 prepares a data item. In some implementations, the data item is interaction data as described herein. In various implementations, the interaction data is identifier 34. Additionally or alternatively, the interaction data may include other identifiers such as one or more private ID's generated by private ID circuit 210 and/or one or more group ID's generated by group ID circuit 220. In some implementations, the interaction data includes additional information such as a interaction type and/or one or more address locations (e.g., landing page URL, reporting URL, etc.). For example, content interaction circuit 230 may prepare the data item by appending a number of group ID's generated by group ID circuit 220 onto identifier 34.

At step 1204, first encryption circuit 244 encrypts the data item using the asymmetric encryption public key generated by decryption circuit 444 to produce a singly encrypted data item. In various implementations, decryption circuit 444 encrypts the data item using an RSA cryptosystem. In various implementations, first encryption circuit 244 appends an address location to the singly encrypted data item. For example, first encryption circuit 244 may append a reporting URL to the singly encrypted data item. In some implementations, the reporting URL determines where second data processing system 400 transmits aggregate information. As a concrete example, content provider device 30 may specify a location via the reporting URL to receive aggregate information regarding the effectiveness of a marketing campaign.

At step 1206, hashing circuit 242 hashes the singly encrypted data item to produce a shared key. In various implementations, hashing circuit 242 hashes the singly encrypted data item with a fast hash function such as SpookyHash. At step 1208, second encryption circuit 246 generates a numberspace using the shared key. For example, the numberspace may be integers modulo the shared key. At step 1210, second encryption circuit 246 generates a threshold secret sharing polynomial using the singly encrypted data item and coefficients picked from the numberspace. For example, the coefficients may be $a_1, \ldots, a_{k-1}$ as described above in reference to FIG. 6A.

At step 1212, hashing circuit 242 hashes the singly encrypted data item with a private ID generated by private ID circuit 210 to produce an evaluation point. In various implementations, hashing circuit 242 appends the private ID to the singly encrypted data item before hashing, thereby making the evaluation point unique to the client device 10. In various implementations, the evaluation point is i as described above in reference to FIG. 6A. At step 1214, second encryption circuit 246 evaluates the polynomial at the evaluation point to produce a first key half. In various implementations, the first key half is f (i) as described above in reference to FIG. 6A. At step 1216, second encryption circuit 246 combines the first key half with the evaluation point to produce the encrypted secret share. In various implementations, the encrypted secret share is the tuple (i, f(i)) as described above with reference to FIG. 6A. At step 1218, second encryption circuit 246 generates one or more verification shares $c_0, \ldots, c_k$ based on the shared key. For example, the verification shares may be generated as:

$$c_i = \text{shared key}^{a_i}$$

where $c_i$ is the verification share corresponding to coefficient $a_i$. At step 1220, client device 10 transmits the secret share, the one or more verification shares, and the shared key to first data processing system 300.

Referring now specifically to FIG. 14, the method 1300 of verifying and decrypting the secret shares as implemented by system 150 is shown, according to an implementation. At step 1302, fraud prevention circuit 334 verifies the secret shares by comparing the one or more verification shares to the shared key. Comparing the one or more verification shares to the shared key may include computing:

$$\text{shared key}^{f(i)} \stackrel{?}{=} c_0 c_0^{i} c_2^{i^2} \ldots c_t^{i^t}$$

where t is the number of secret shares received by first data processing system 300. In various implementations, t is the number of secret shares corresponding to a group received by first data processing system 300. For example, each secret share may be tagged with a group ID and t may be the number of secret shares having the same group ID. If fraud prevention circuit 334 determines that $$\text{shared key}^{f(i)} = c_0 c_0^{i} c_2^{i^2} \ldots c_t^{i^t}$$

then the shares are verified as authentic. If fraud prevention circuit 334 determines that $$\text{shared key}^{f(i)} \neq c_0 c_0^{i} c_2^{i^2} \ldots c_t^{i^t}$$

then the shares are not verified and are determined to be inauthentic (e.g., improperly calculated, having been tampered with, etc.).

At step 1304, decryption circuit 336 reconstructs the threshold secret sharing polynomial based on the received secret shares. For example, secret shares having a similar tag (e.g., group ID, etc.) may be combined using polynomial interpolation to recover the threshold secret sharing polynomial. At step 1306, decryption circuit 336 extracts the singly encrypted data item from the reconstructed threshold secret sharing polynomial. In various implementations, the singly encrypted data item corresponds to $a_0$ as described above. In some implementations, shuffle circuit 338 shuffles the singly encrypted data item with other singly encrypted data items. For example, shuffle circuit 338 may intermingle a number of singly encrypted data items from a number of different marketing campaigns. At step 1308, first data processing system 300 transmits the singly encrypted data item to second data processing system 400.

Figure 15:
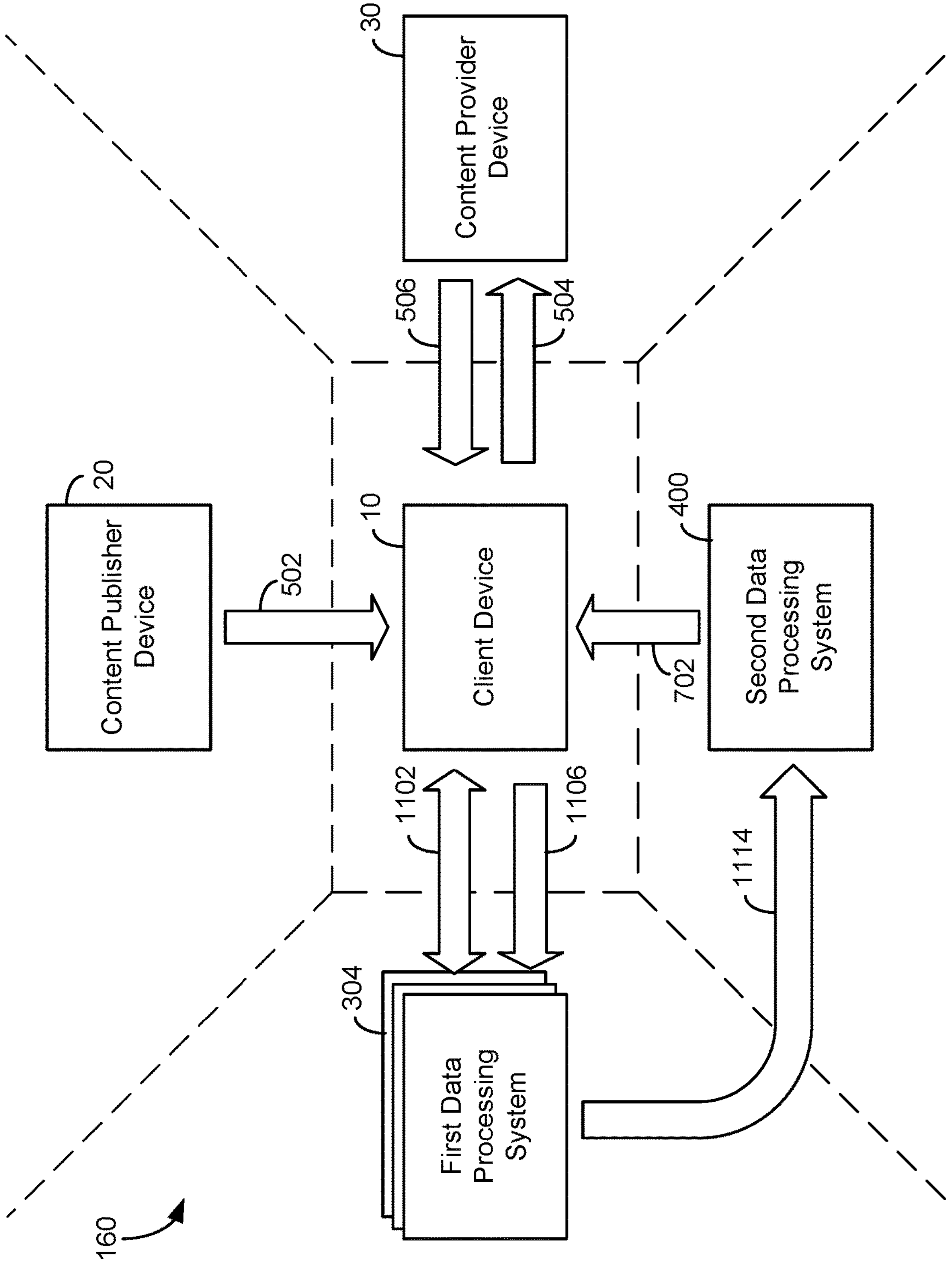
FIG. 15, is a diagram illustrating the secret sharing scheme of FIG. 8 including multiple data processing systems, according to an illustrative implementation.

Referring now to FIG. 15, a system 160 implementing a secret sharing scheme including fraud prevention and recovery is shown, according to an implementation. System 160 may be similar to those described herein (e.g., system 110, system 120, system 130, system 140, system 150, etc.). In various implementations, system 160 includes a number of first data processing systems 304. For example, system 160 may include 100 first data processing systems 304. First data processing systems 304 may be similar to first data processing system 300. In various implementations, system 160 operates similarly to system 150 described above. Each of first data processing systems 304 may receive secret shares from client device 10 and decrypt the secret shares to recover singly encrypted data items. In various implementations, each of first data processing systems 304 may compare their respective recovered singly encrypted data items. First data processing systems 304 may develop a consensus on the authentic singly encrypted data item and may transmit the authentic singly encrypted data item to second data processing system 400. Advantageously, by comparing the recovered singly encrypted data items from many first data processing systems 304, system 160 is robust against an individually compromised first data processing system 300. For example, if first data processing system 300 improperly recovers the singly encrypted data item from the secret shares and/or if first data processing system 300 is maliciously compromised, then aggregate information generated by second data processing system 400 may be illegitimate. However, developing a consensus among many first data processing systems 304 ensures that a majority of the first data processing systems 304 would have to improperly recover the singly encrypted data item and/or become maliciously compromised to affect the aggregate information, thereby increasing the robustness of the system and the authenticity of the aggregate information.

In various implementations, system 160 may facilitate other fraud prevention and/or robust recovery techniques. For example, client device 10 and/or first data processing system 300 may implement ECC's. For example, second encryption circuit 246 may construct secret shares as Reed-Solomon codes. Using the Reed-Solomon codes, decryption circuit 336 may correct up to $$\frac{n-t}{2}$$

errors (e.g., improperly or maliciously generated secret shares) using the Berlekamp-Welch algorithm. Additionally or alternatively, second encryption circuit 246 and/or decryption circuit 336 may implement limited-domain evaluation. As a concrete example, second encryption circuit 246 may deterministically compute evaluation point i such that $1<i<M$, where M is a small number such that $M \geq t$. For example, hashing circuit 242 may append a private ID to a group ID and hash the combination to generate i. During decryption and reconstruction of the threshold secret sharing polynomial, decryption circuit 336 receives secret shares (i, f(i)) where many of the secret shares (i, f(i)) have a common evaluation point i (e.g., a subset of the secret shares (i, f(i)) are of the form: $(i_1, f(i_1)=s)$, $(i_1, f(i_1)=s_2)$, . . . , $(i_1, f(i_1)=s_n)$). Decryption circuit 336 may choose a consensus $f(i_1)$ (e.g., the $f(i_1)$ this is most common among the secret shares) for reconstruction using polynomial interpolation. Limited-domain evaluation protects against improperly or maliciously computed secret shares. For example, a malicious client device 10 must corrupt a majority of $$\frac{M-t}{2}$$

different evaluation points i to suppress decryption of the secret shares.

Figure 16:
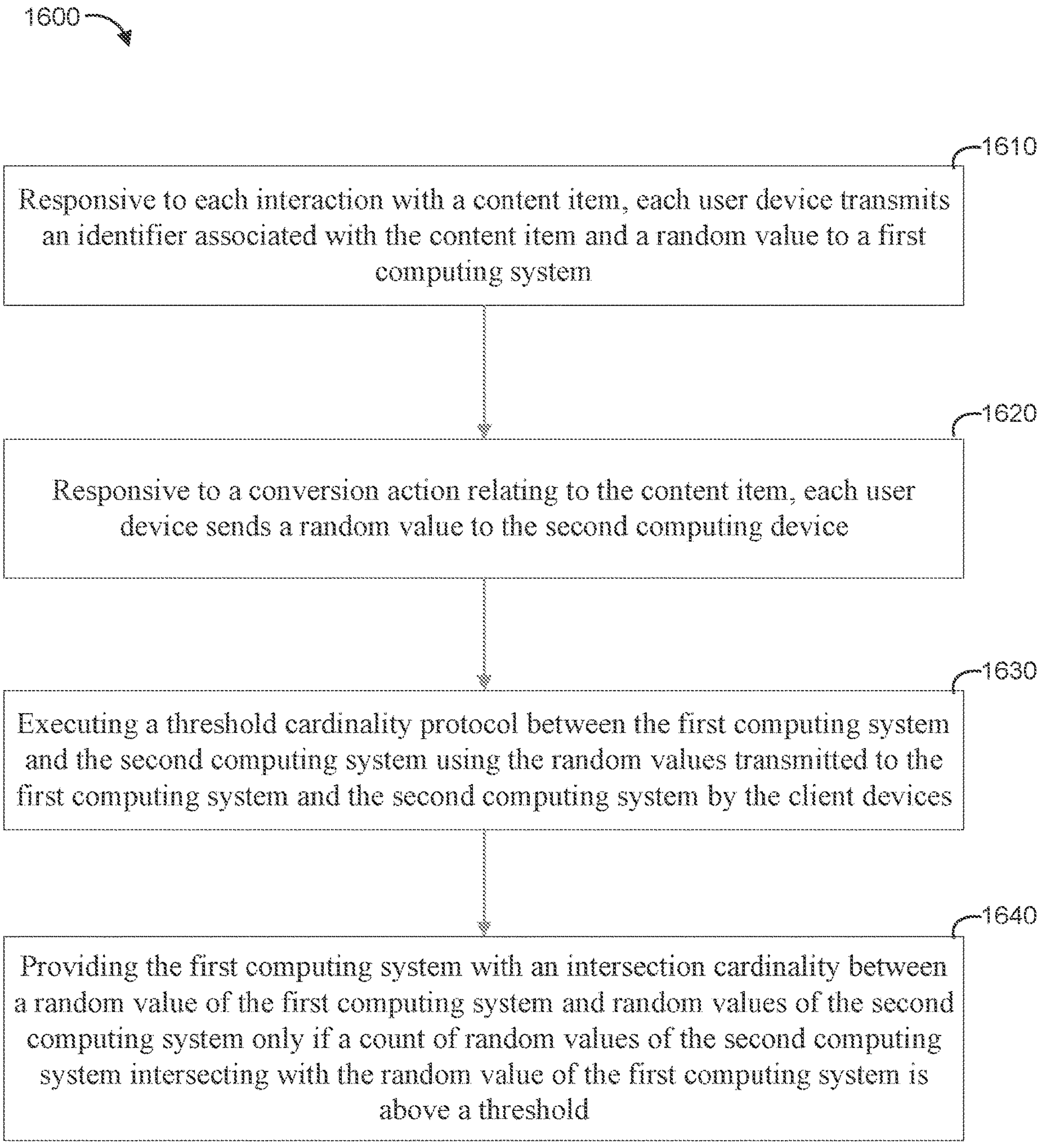
FIG. 16 is a flowchart of a process for protecting user privacy, according to an illustrative implementation.

Referring now to FIG. 16, a process 1600 is shown for protecting user privacy according to an illustrative implementation. First data processing system 300 and second data processing system 400 may be configured to perform the steps of process 1600. Furthermore, any one or a combination of computing devices described herein can be configured to perform the process 1600.

Step 1610 includes, at each of a plurality of client devices 10, responsive to each interaction with a content item, transmitting an identifier associated with the content item and a random value to a first computing system. The first computing system may be the same as or similar to first data processing system 300 as discussed above. The first computing system stores the identifier and the random value associated with the identifier. The identifier identifies a content identifier that is associated with the content item.

Step 1620 includes, at each of a plurality of client devices 10, responsive to a conversion action relating to the content item, sending a random value to a second computing device. The second computing device may be similar to the second data processing system 400 as discussed above. Client device 10 determines whether there is an interaction with the content item had occurred prior to the conversion action. In response to determining that there is an interaction with the content item that had occurred prior to the conversion action, client device 10 sends a last generated random value to second data processing system 400. In response to determining that there is no previous interaction with the content item that had occurred, client device 10 transmits a different random value to second data processing system 400.

Step 1630 includes executing a threshold cardinality protocol between first data processing system 300 and second data processing system 400 using the random values transmitted to first data processing system 300 and second data processing system 400 by a number of client devices 10. In some implementations, for each content identifier, first data processing system 300 and second data processing system 400 run the threshold cardinality protocol. Second data processing system 400 inputs all the tokens it has collected. First data processing system 300 inputs only the tokens associated with the content identifier. First data processing system 300 receives the intersection cardinality only if the intersection cardinality is above a predetermined threshold value.

In some implementations, garbled circuits are used to sort the two sets of inputs from first data processing system 300 and second data processing system 400. The garbled circuits process a linear scan to count how many items are in the interaction.

In some implementations, batching techniques are used to essentially partition the two big sets into smaller bins, where equal values are guaranteed to be assigned to corresponding bins. In some implementations, hashing techniques (e.g., Cuckoo hashing) are used to pad each bin to a smaller size (e.g., a log N size). Then, intersection cardinality protocol is run on each bin and give each party (e.g., the first and the second computing system) an arithmetic share of the output.

Each party sums up locally its shares. The two parties run a two-party protocol that checks whether the total count is above the threshold. If the total count is above the threshold, the data items are released to the first computing system. When the Cuckoo hashing is used, PIR-like techniques may be used for each bin.

Figure 17:
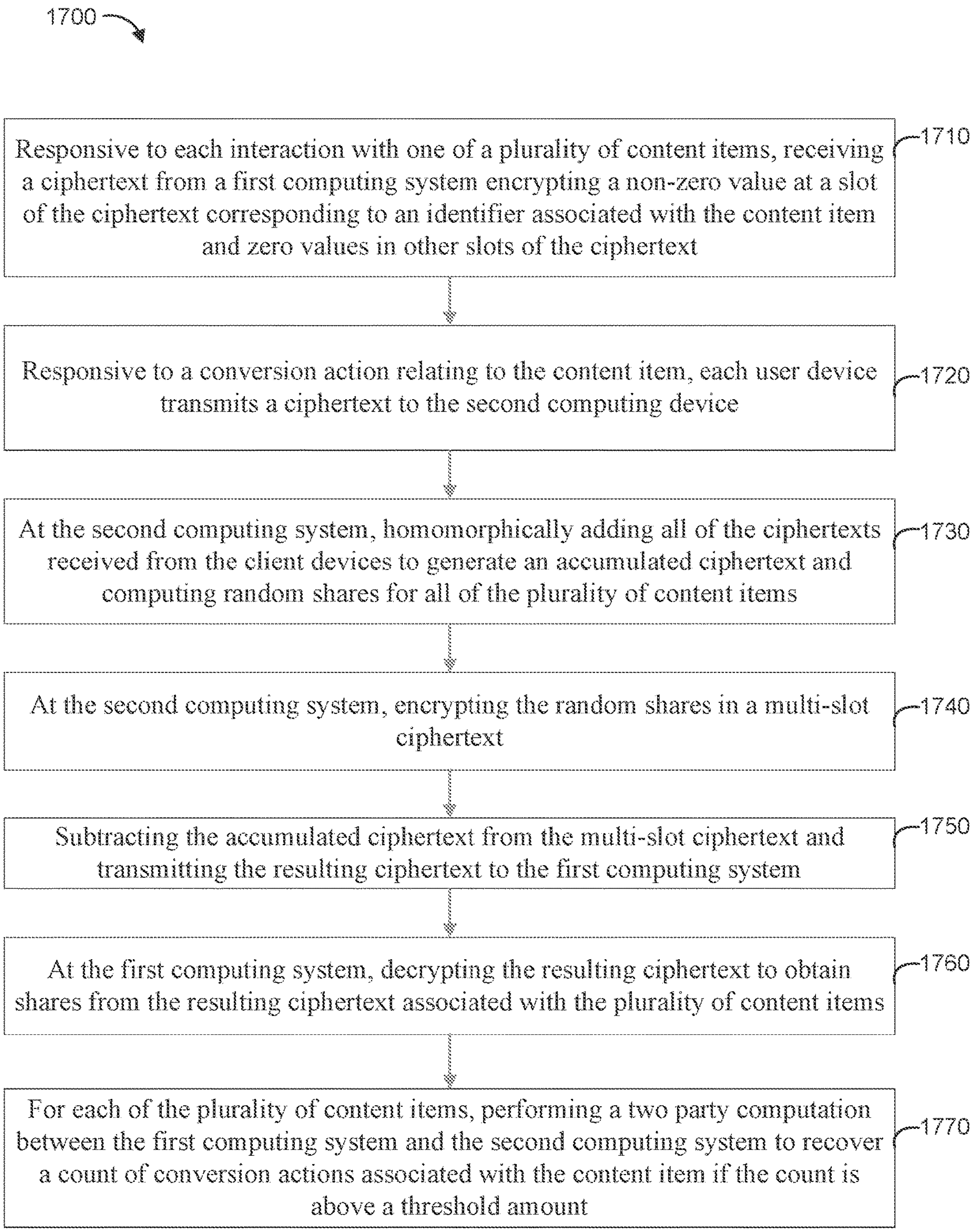
FIG. 17 is a flowchart of another process for protecting user privacy, according to an illustrative implementation.

Referring now to FIG. 17, a process 1700 is shown for protecting user privacy according to an illustrative implementation. First data processing system 300 and second data processing system 400 may be configured to perform the steps of process 1700. Furthermore, any one or combination of computing devices described herein can be configured to perform the process 1700.

At step 1710, responsive to each interaction with one of a plurality of content items, each client device 10 receives a ciphertext from a first computing system encrypting a non-zero value at a slot of the ciphertext corresponding to an identifier associated with the content item and zero values in other slots of the ciphertext. In various embodiments, the first computing system is or is similar to first data processing system 300.

At step 1720, responsive to a conversion action relating to the content item, each client device 10 sends a ciphertext to the second computing device. In various embodiments, the second computing device is or is similar to second data processing system 400. If an interaction with the content item had occurred prior to the conversion action, the ciphertext to be sent is a last received ciphertext. If no previous interaction with the content item had occurred, the ciphertext to be sent is encrypting zero values in all slots.

At step 1730, second data processing system 400 homomorphically adds all of the ciphertexts received from client devices 10 to generate an accumulated ciphertext and computes random shares for all of the plurality of content items.

At step 1740, second data processing system 400 encrypts the random shares in a multi-slot ciphertext.

At step 1750, second data processing system 400 subtracts the accumulated ciphertext from the multi-slot ciphertext and transmitting the resulting ciphertext to the first computing system.

At step 1760, first data processing system 300 decrypts the resulting ciphertext to obtain shares from the resulting ciphertext associated with the plurality of content items.

Step 1770 includes, for each of the plurality of content items, performing a two-party computation between first data processing system 300 and second data processing system 400 to recover a count of conversion actions associated with the content item if the count is above a threshold amount.

Figure 18:
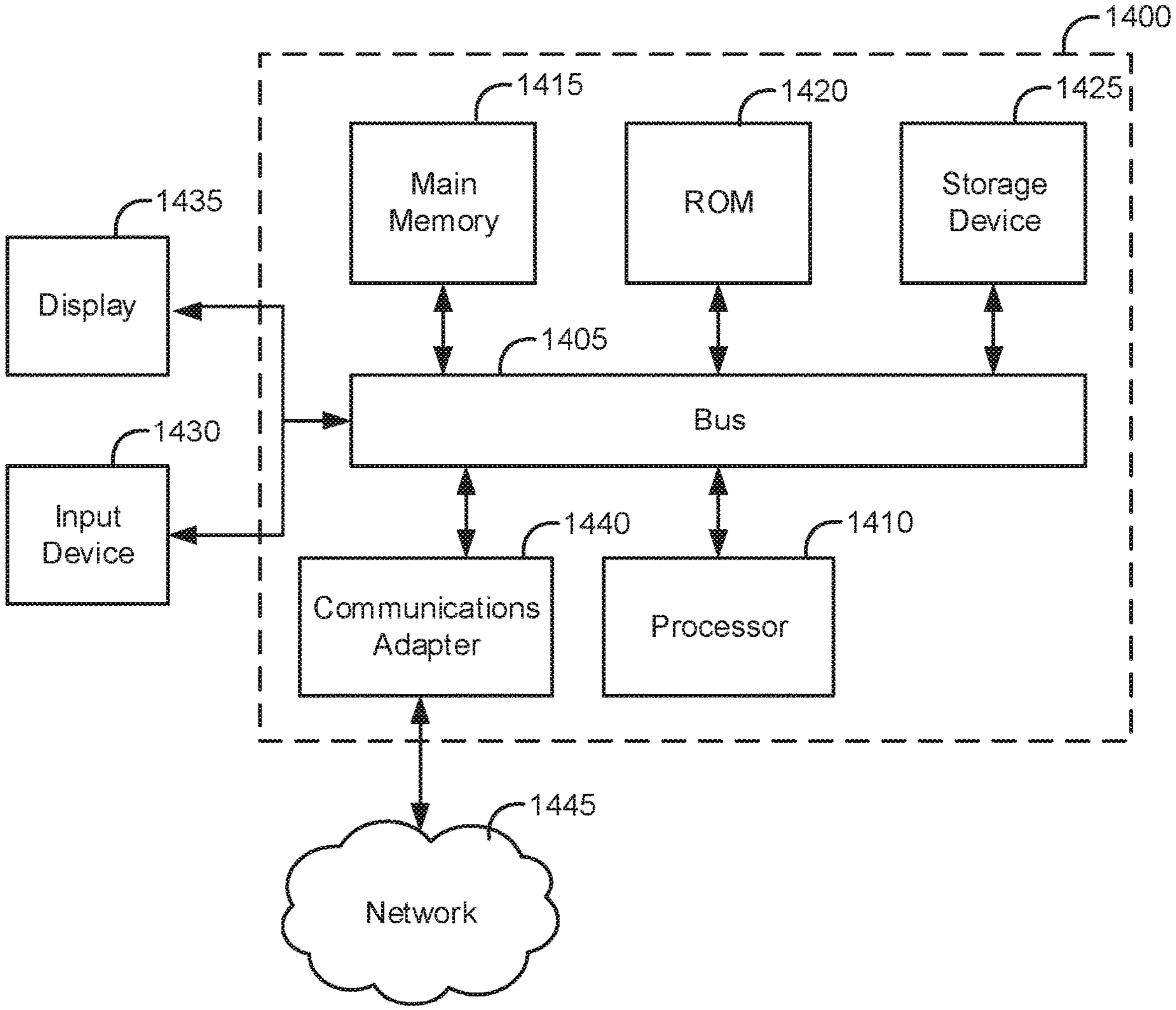
FIG. 18 is a block diagram of a computing system, according to an illustrative implementation.

FIG. 18 illustrates a depiction of a computing system 1400 that can be used, for example, to implement any of the illustrative systems (e.g., system 110, system 120, system 130, system 140, system 150, system 160, etc.) described in the present disclosure. The computing system 1400 includes a bus 1405 or other communication component for communicating information and a processor 1410 coupled to the bus 1405 for processing information. The computing system 1400 also includes main memory 1415, such as a random access memory ("RAM") or other dynamic storage device, coupled to the bus 1405 for storing information, and instructions to be executed by the processor 1410. Main memory 1415 can also be used for storing position information, temporary variables, or other intermediate information during execution of instructions by the processor 1410. The computing system 1400 may further include a read only memory ("ROM") 1420 or other static storage device coupled to the bus 1405 for storing static information and instructions for the processor 1410. A storage device 1425, such as a solid state device, magnetic disk or optical disk, is coupled to the bus 1405 for persistently storing information and instructions.

The computing system 1400 may be coupled via the bus 1405 to a display 1435, such as a liquid crystal display, or active matrix display, for displaying information to a user. An input device 1430, such as a keyboard including alphanumeric and other keys, may be coupled to the bus 1405 for communicating information, and command selections to the processor 1410. In another implementation, the input device 1430 has a touch screen display 1435. The input device 1430 can include a cursor control, such as a mouse, a trackball, or cursor direction keys, for communicating direction information and command selections to the processor 1410 and for controlling cursor movement on the display 1435.

In some implementations, the computing system 1400 may include a communications adapter 1440, such as a networking adapter. Communications adapter 1440 may be coupled to bus 1405 and may be configured to enable communications with a computing or communications network 1445 and/or other computing systems. In various illustrative implementations, any type of networking configuration may be achieved using communications adapter 1440, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 1400 in response to the processor 1410 executing an arrangement of instructions contained in main memory 1415. Such instructions can be read into main memory 1415 from another computer-readable medium, such as the storage device 1425. Execution of the arrangement of instructions contained in main memory 1415 causes the computing system 1400 to perform the illustrative processes described herein. One or more processors in a multi-processing arrangement may also be employed to execute the instructions contained in main memory 1415. In alternative implementations, hard-wired circuitry may be used in place of or in combination with software instructions to implement illustrative implementations. Thus, implementations are not limited to any specific combination of hardware circuitry and software.

Although an example processing system has been described in FIG. 18, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user. In situations in which the systems described herein collect personal information about users or applications installed on a user device, or make use of personal information, the users are provided with an opportunity to control whether programs or features collect user information (e.g., information about a user's social network, social actions, or activities, profession, a user's preferences, or a user's current location). In addition or in the alternative, certain data may be treated in one or more ways before it is stored or used, so that personal information is removed.

Systems and methods of the present disclosure offer many benefits over existing systems. To avoid revealing PII, and in light of increased awareness of user privacy, strict privacy guarantees are developing. For example, differential privacy, a widely accepted standard, requires that aggregated interaction measurements must not reveal if a particular individual's information was included in calculating interaction rates. However, current differentially private aggregated interaction measurement techniques require immense data-sets and have limited output granularity. Therefore, a privacy protected method of measuring aggregate interactions that provides detailed output with reasonably sized input data-sets is needed.

One solution utilizes a third party helper. Client browsers may derive a seed from measurement labels by performing an OPRF protocol with the third party helper. Client browsers may apply two layers of encryption to the measurement labels. The second layer of encryption may be threshold-encryption based on the derived seed. The client browsers may batch the encrypted measurement labels and send them to the third party helper. The third party helper may remove the second layer of encryption by threshold-decrypting the encrypted measurement labels. The third party helper may shuffle the singly encrypted measurement labels and forward them on to analyzers. The analyzers may remove the first layer of encryption and recover the measurement labels.

In some implementations, client browsers attach a crowd identifier to the measurement labels. The crowd identifier may enable the system to produce aggregate interaction measurements for unique (and therefore identifying) measurement labels without requiring immense data-sets while maintaining strict privacy guarantees. The crowd identifier may describe a geographic location, a device type, and/or any other differentiating category. The crowd identifier may be used in deriving the seed via the OPRF. Therefore, the third party helper may only threshold-decrypt unique measurement labels having a threshold number of occurrences. The threshold number of occurrences may ensure strict privacy guarantees for PII.

In some implementations, content providers generate an interaction token using a privately held key. The interaction token may be used for fraud prevention by verifying the legitimacy of a measurement label. The system may verify the interaction token using a public key of the content provider. Client browsers may only report measurement labels associated with a verified interaction token. Furthermore, each measurement label may only be used once. Therefore, the system prevents fraud based on illegitimate measurement labels.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit). Circuit as utilized herein, may be implemented using hardware circuitry (e.g., FPGAs, ASICs, etc.), software (instructions stored on one or more computer readable storage media and executable by one or more processors), or any combination thereof.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant ("PDA"), a mobile audio or video player, a game console, a Global Positioning System ("GPS") receiver, or a portable storage device (e.g., a universal serial bus ("USB") flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable television channel, on a satellite television channel, or stored on a local hard drive. A set-top box ("STB") or set-top unit ("STU") may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A first computing system, comprising:

a memory having instructed stored thereon, and a processor configured to execute the instructions to:

engage, with a plurality of client devices, in an oblivious pseudorandom function protocol using a plurality of data items to produce a plurality of seeds;

receive, from the plurality of client devices, a plurality of encrypted secret shares and a plurality of verification shares;

authenticate the plurality of encrypted secret shares by comparing the plurality of verification shares to a shared key associated with the encrypted secret shares, wherein each of the plurality of verification shares is a cryptographic commitment to a corresponding encrypted secret share;

process the plurality of encrypted secret shares to produce processed data; and transmit the processed data to a second computing system, wherein the second computing system is configured to (i) recover underlying data from the plurality of encrypted secret shares and (ii) perform one or more aggregation operations using the underlying data.

2. The first computing system of claim 1, further configured to shuffle the plurality of encrypted secret shares before processing.

3. The first computing system of claim 1, wherein engaging in the oblivious pseudorandom function protocol to produce the seed includes encoding a crowd identifier into the seed, wherein the crowd identifier is associated with two or more of the plurality of client devices.

4. The first computing system of claim 1, wherein the first computing system communicates with the plurality of client devices using a secure network, wherein the secure network is an onion network.

5. The first computing system of claim 1, wherein engaging in the oblivious pseudorandom function protocol to produce the seed includes using a private identifier, wherein the private identifier uniquely identifies a client device of the plurality of client devices.

6. The first computing system of claim 1, wherein the first computing system is a distributed computing system.

7. The first computing system of claim 1, wherein processing the plurality of encrypted secret shares to produce the processed data includes decrypting the encrypted secret shares using a threshold encryption function protocol.

8. The first computing system of claim 1, further including an application programming interface (API), wherein the first computing system transmits the processed data to the second computing system in response to an API query from the second computing system.

9. A method performed by a first computing system, comprising:

engaging, with a plurality of client devices, in an oblivious pseudorandom function protocol using a plurality of data items to produce a plurality of seeds;

receiving, from the plurality of client devices, a plurality of encrypted secret shares and a plurality of verification shares, wherein each of the plurality of verification shares is a cryptographic commitment to a corresponding encrypted secret share;

authenticating the plurality of encrypted secret shares by comparing the plurality of verification shares to a shared key associated with the encrypted secret shares;

processing the plurality of encrypted secret shares to produce processed data; and transmitting the processed data to a second computing system, wherein the second computing system is configured to (i) recover underlying data from the plurality of encrypted secret shares and (ii) perform one or more aggregation operations using the underlying data.

10. The method of claim 9, further comprising shuffling the plurality of encrypted secret shares before processing.

11. The method of claim 9, wherein engaging in the oblivious pseudorandom function protocol to produce the seed includes encoding a crowd identifier into the seed, wherein the crowd identifier is associated with two or more of the plurality of client devices.

12. The method of claim 9, communicating, by the first computing system, with the plurality of client devices using a secure network, wherein the secure network is an onion network.

13. The method of claim 9, wherein engaging in the oblivious pseudorandom function protocol to produce the seed includes engaging in the oblivious pseudorandom function protocol using a private identifier, wherein the private identifier uniquely identifies a client device of the plurality of client devices.

14. The method of claim 9, wherein processing the plurality of encrypted secret shares to produce the processed data includes decrypting the encrypted secret shares using a threshold encryption function protocol.

15. The method of claim 9, further comprising:

receiving, by the first computing system, an application programming interface (API) request from the second computing system, wherein:

transmitting the processed data to the second computing system comprise transmitting the processed data to the second computing system in response to the API query from the second computing system.

16. A non-transitory computer readable medium, storing instructions that, upon execution by a first computing device, cause the first computing device to perform operations comprising:

engaging, with a plurality of client devices, in an oblivious pseudorandom function protocol using a plurality of data items to produce a plurality of seeds;

receiving, from the plurality of client devices, a plurality of encrypted secret shares and a plurality of verification shares, wherein each of the plurality of verification shares is a cryptographic commitment to a corresponding encrypted secret share;

authenticating the plurality of encrypted secret shares using by comparing the plurality of verification shares to a shared key associated with the encrypted secret shares;

processing the plurality of encrypted secret shares to produce processed data; and transmitting the processed data to a second computing system, wherein the second computing system is configured to (i) recover underlying data from the plurality of encrypted secret shares and (ii) perform one or more aggregation operations using the underlying data.

* * * * *